US011042034B2

(12) United States Patent
Sztuk et al.

(10) Patent No.: US 11,042,034 B2
(45) Date of Patent: Jun. 22, 2021

(54) HEAD MOUNTED DISPLAY CALIBRATION USING PORTABLE DOCKING STATION WITH CALIBRATION TARGET

(71) Applicant: Facebook Technologies, LLC, Menlo Park, CA (US)

(72) Inventors: Sebastian Sztuk, Menlo Park, CA (US); Javier San Agustin Lopez, Menlo Park, CA (US); Sapna Shroff, Sunnyvale, CA (US); Robert Dale Cavin, Seattle, WA (US); Alexander Jobe Fix, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 14 days.

(21) Appl. No.: 16/557,419

(22) Filed: Aug. 30, 2019

(65) Prior Publication Data
US 2020/0209628 A1    Jul. 2, 2020

Related U.S. Application Data

(60) Provisional application No. 62/785,595, filed on Dec. 27, 2018.

(51) Int. Cl.
*G02B 27/01*      (2006.01)
*G06F 3/01*      (2006.01)
*H02J 7/00*      (2006.01)

(52) U.S. Cl.
CPC ..... *G02B 27/0172* (2013.01); *G02B 27/0176* (2013.01); *G06F 3/013* (2013.01);
(Continued)

(58) Field of Classification Search
CPC ...... G02B 2027/011; G02B 2027/0138; G02B 2027/014; G02B 2027/0178;
(Continued)

(56) References Cited

U.S. PATENT DOCUMENTS

2003/0004694 A1*   1/2003   Aliaga ................... G06T 5/006
                                                                               703/2
2012/0218301 A1*   8/2012   Miller ................ G02B 27/0172
                                                                           345/633

(Continued)

FOREIGN PATENT DOCUMENTS

| CN | 107464265 A | 12/2017 |
|---|---|---|
| CN | 108287397 A | 7/2018 |
| CN | 108537846 A | 9/2018 |

OTHER PUBLICATIONS

International Search Report and Written Opinion of International Application No. PCT/US2019/068529, dated Apr. 2, 2020, 13 pp.

*Primary Examiner* — Kenneth Bukowski
(74) *Attorney, Agent, or Firm* — Shumaker & Sieffert, P.A.

(57) ABSTRACT

A system is describes that includes a head mounted display (HMD) and a portable docking station configured to receive the HMD for calibration of one or more components of the HMD. The portable docking station includes at least one calibration target, e.g., a checkerboard pattern and/or a convex reflector. Techniques of this disclosure include calibrating an image capture device of the HMD based on one or more images of the calibration target captured by the image capture device when the HMD is placed in the portable docking station. The disclosed techniques may be applied to calibrate multiple different components of the HMD, including image capture devices such as eye-tracking cameras and inside-out cameras, displays, illuminators, sensors, and the like. In some examples, a rechargeable battery of the HMD may be charged when the HMD is placed in the portable docking station.

20 Claims, 9 Drawing Sheets

(52) U.S. Cl.
CPC ...... *H02J 7/0044* (2013.01); *G02B 2027/014* (2013.01); *G02B 2027/0138* (2013.01); *G02B 2027/0178* (2013.01)

(58) Field of Classification Search
CPC ........ G02B 2027/0187; G02B 27/0172; G02B 27/0176; G02B 27/0179; G02B 7/02; G06T 7/85; G06T 7/80; G06F 3/012; G06F 3/013; H02J 7/0044; H04M 1/04; A61B 5/01
See application file for complete search history.

(56) References Cited

U.S. PATENT DOCUMENTS

| | | | |
|---|---|---|---|
| 2013/0120224 A1* | 5/2013 | Cajigas | G09G 5/00 345/8 |
| 2014/0285676 A1 | 9/2014 | Barreto et al. | |
| 2016/0012643 A1* | 1/2016 | Kezele | G02B 27/0093 345/633 |
| 2016/0309143 A1* | 10/2016 | Fu | H04N 13/344 |
| 2017/0112440 A1 | 4/2017 | Mauri et al. | |
| 2018/0024616 A1* | 1/2018 | Kubota | G06F 1/26 713/323 |
| 2018/0314296 A1 | 11/2018 | Evans, V et al. | |
| 2019/0318706 A1* | 10/2019 | Peng | G02B 26/08 |

* cited by examiner

HEAD MOUNTED DISPLAY CALIBRATION USING PORTABLE DOCKING STATION WITH CALIBRATION TARGET

This application claims the benefit of U.S. Provisional Application No. 62/785,595, filed Dec. 27, 2018, the entire content of which is incorporated herein by reference.

TECHNICAL FIELD

This disclosure generally relates to head mounted displays and, more particularly calibration of components within a head mounted display.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The HMD may include one or more components (e.g., image capture devices, illuminators, sensors, and the like) configured to capture images and other data used to compute a current pose (e.g., position and orientation) of a frame of reference, such as the HMD. The HMD selectively renders the artificial reality content for display to the user based on the current pose.

SUMMARY

In general, this disclosure describes a system including a head mounted display (HMD) and a portable docking station configured to receive the HMD for calibration of one or more components of the HMD. The portable docking station includes at least one calibration target, e.g., a checkerboard pattern and/or a convex reflector. In some examples, the portable docking station may include fixtures to hold the HMD in a fixed position and/or fiducial marks used to determine a position of the HMD within the portable docking station. Techniques of this disclosure include calibrating one or more image capture devices (e.g., cameras) of the HMD based on one or more images of the calibration target captured by the image capture devices when the HMD is placed in the portable docking station. A calibration engine, executed on the HMD or a peripheral device associated with the HMD, may perform the calibration by determining intrinsic and/or extrinsic parameters of the image capture devices based on the captured images of the calibration target and a spatial relationship between the position of the HMD and a position of the calibration target within the portable docking station, and then configuring or re-configuring the image capture devices to operate according to the determined parameters. The disclosed techniques may be applied to calibrate multiple different components of the HMD, including image capture devices such as eye-tracking cameras and inside-out cameras, displays, illuminators, sensors, and the like.

In some examples, a rechargeable battery of the HMD may be charged when the HMD is placed in the portable docking station. In this way, the one or more components of the HMD may be calibrated during or immediately after charging so as to not create an additional maintenance step for a user of the HMD. In some examples, the calibration of the one or more components of the HMD may be triggered upon determining that the HMD has been received by the portable docking station and/or determining that the rechargeable battery of the HMD is charged to at least a threshold charge level while the HMD is within the portable docking station.

In one example, this disclosure is directed to a system comprising a HMD comprising at least one image capture device; a portable docking station configured to receive the HMD, the portable docking station including at least one calibration target that is within a field of view of the at least one image capture device when the HMD is placed in the portable docking station; and a processor executing a calibration engine configured to calibrate the at least one image capture device of the HMD based on one or more images of the at least one calibration target captured by the at least one image capture device when the HMD is placed in the portable docking station.

In another example, this disclosure is directed to a method comprising receiving, by a portable docking station, a HMD comprising at least one image capture device, wherein the portable docking station includes at least one calibration target that is within a field of view of the at least one image capture device when the HMD is placed in the portable docking station; determining that the at least one image capture device of the HMD is to be calibrated; and calibrating the at least one image capture device of the HMD based on one or more images of the at least one calibration target captured by the at least one image capture device when the HMD is placed in the portable docking station.

In a further example, this disclosure is directed to a non-transitory computer-readable medium comprising instruction that, when executed, cause on or more processors to determine that a HMD has been received by a portable docking station, wherein the portable docking station includes at least one calibration target that is within a field of view of at least one image capture device of the HMD when the HMD is placed in the portable docking station; determine that the at least one image capture device of the HMD is to be calibrated; and calibrate the at least one image capture device of the HMD based on one or more images of the at least one calibration target captured by the at least one image capture device when the HMD is placed in the portable docking station.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
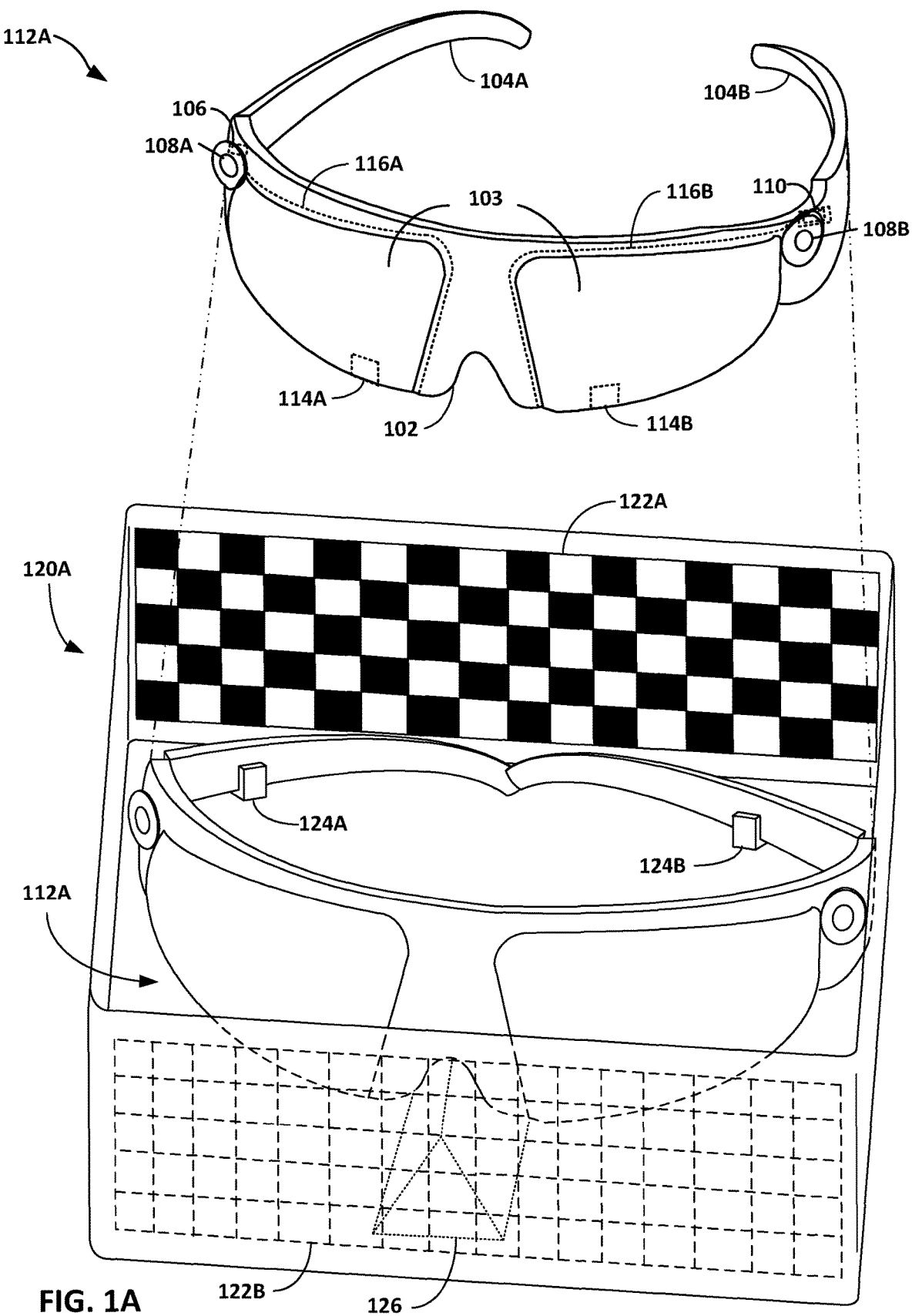
FIGS. 1A-1C are illustrations depicting example HMDs having an eyeglass form factor and example portable docking stations configured to receive the HMDs for calibration, in accordance with the techniques of the disclosure.
Figure 1B:
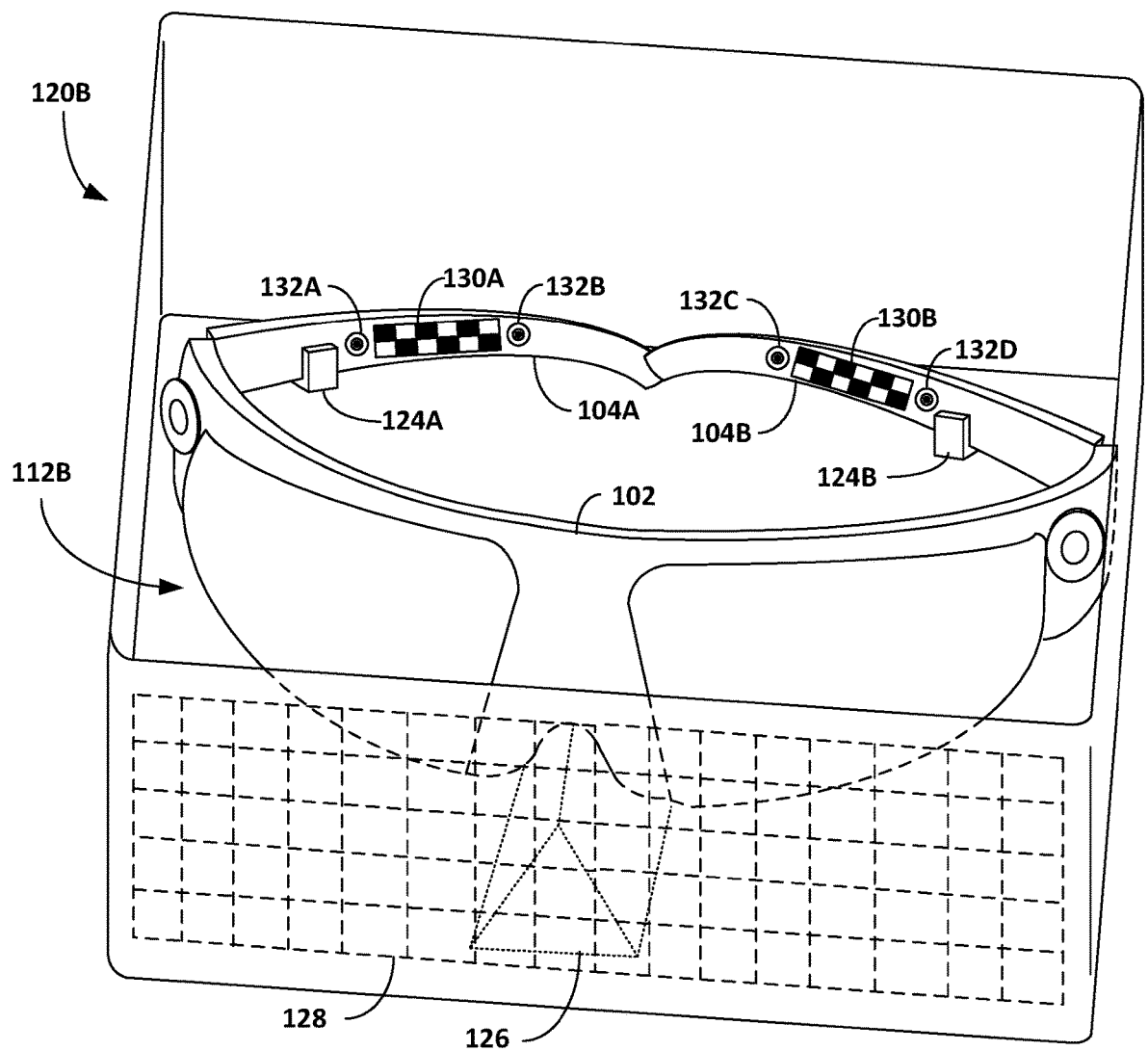
Figure 1C:
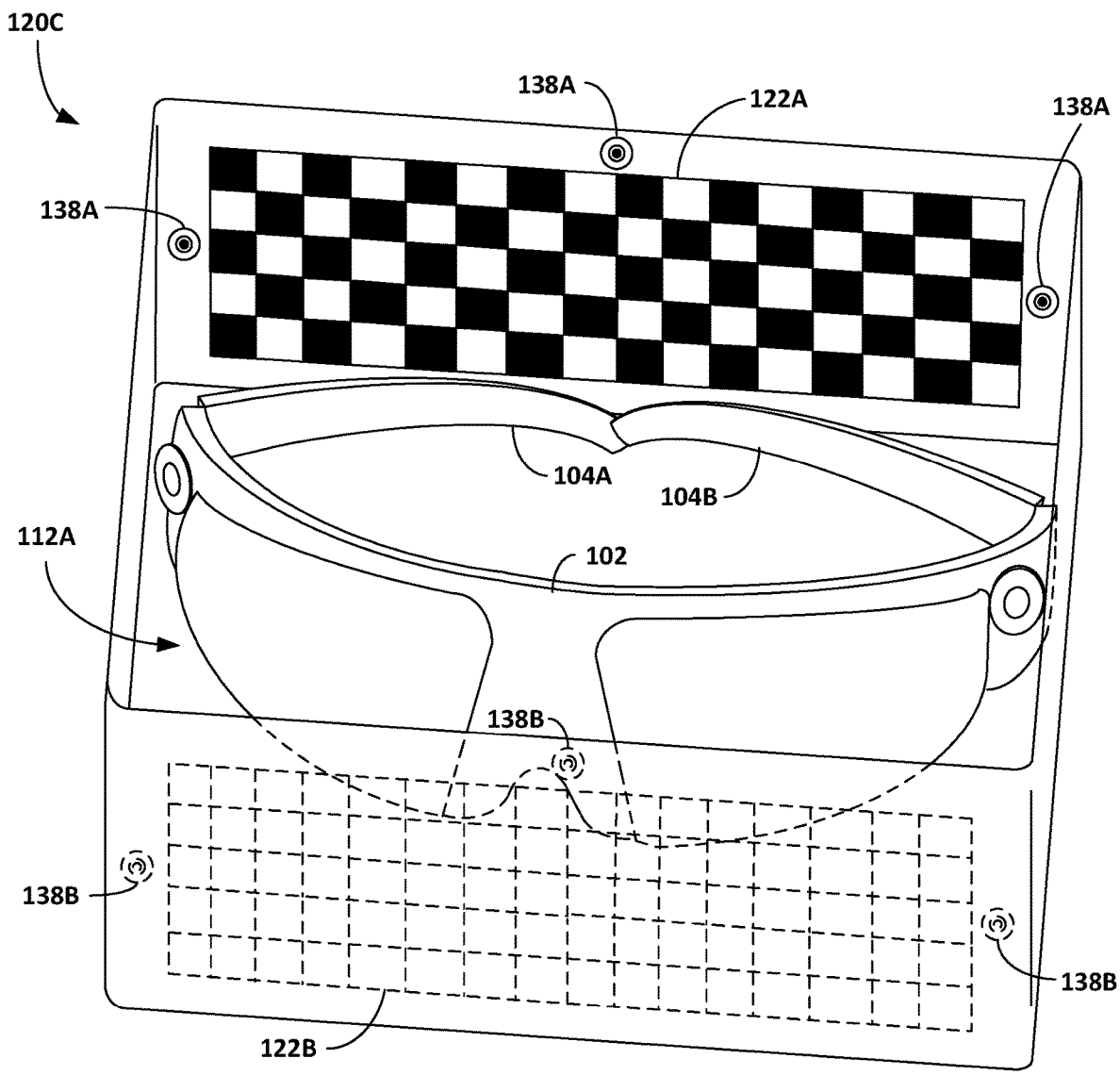

FIGS. 1A-1C are illustrations depicting example HMDs 112A-112B having an eyeglass form factor and example portable docking stations 120A-120C configured to receive the HMDs for calibration, in accordance with the techniques of the disclosure. Techniques are described in which one or more image capture devices (e.g., cameras) of HMDs 112 are calibrated based on one or more images of calibration targets captured by the image capture devices when the HMDs 112 are placed in respective portable docking stations 120.

In general, each of HMDs 112 of FIGS. 1A-1C may operate as a stand-alone, mobile artificial realty system, or may be part of an artificial reality system that includes a peripheral device and/or a console. In any case, the artificial reality system uses information captured from a real-world, 3D physical environment to render artificial reality content for display to a user of the HMD. In the case of a stand-alone, mobile artificial reality system (described in more detail with respect to FIG. 3), each of HMDs 112 constructs and renders the artificial reality content itself.

In the case of an artificial reality system that includes a peripheral device and/or a console (described in more detail with respect to FIG. 5), the peripheral device and/or the console may perform at least some of the construction and rendering of the artificial reality content for display by the HMD. As one example, an HMD may be in communication with, e.g., tethered to or in wireless communication with, a console. The console may be a single computing device, such as a gaming console, workstation, a desktop computer, or a laptop, or distributed across a plurality of computing devices, such as a distributed computing network, a data center, or a cloud computing system. As another example, an HMD may be associated with a peripheral device that coexists with the HMD and, in some examples, operates as an auxiliary input/output device for the HMD in a virtual environment. The peripheral device may operate as an artificial reality co-processing device to which some of the functions of the HMD are offloaded. In some examples, the peripheral device may be a smartphone, tablet, or other hand-held device.

FIG. 1A is an illustration depicting HMD 112A both outside of and received within portable docking station 120A. In the example of FIG. 1A, HMD 112A comprises an eyeglass form factor that includes a rigid frame front 102 having two eyepieces connected by a nose bridge and two temples or arms 104A and 104B (collectively, "arms 104") that fit over a user's ears to secure HMD 112A to the user. In addition, in place of lenses in a traditional pair of eyeglasses, HMD 112A includes interior-facing electronic display 103 configured to present artificial reality content to the user. Electronic display 103 may be any suitable display technology, such as liquid crystal displays (LCD), quantum dot display, dot matrix displays, light emitting diode (LED) displays, organic light-emitting diode (OLED) displays, waveguide displays, cathode ray tube (CRT) displays, e-ink, or monochrome, color, or any other type of display capable of generating visual output. In some examples, electronic display 103 is a stereoscopic display for providing separate images to each eye of the user. In some examples, the known orientation and position of display 103 relative to the rigid frame front 102 of HMD 112A is used as a frame of reference, also referred to as a local origin, when tracking the position and orientation of HMD 112A for rendering artificial reality content according to a current perspective of HMD 112A and the user.

As further shown in FIG. 1A, in this example HMD 112A further includes one or more motion sensors 106, such as one or more accelerometers (also referred to as inertial measurement units or "IMUs") that output data indicative of current acceleration of HMD 112A, global positioning system (GPS) sensors that output data indicative of a location of HMD 112A, radar, or sonar that output data indicative of distances of HMD 112A from various objects, or other sensors that provide indications of a location or orientation of HMD 112A or other objects within a physical environment.

Moreover, HMD 112A may include one or more integrated image capture devices, such as video cameras, laser scanners, Doppler® radar scanners, depth scanners, or the like. For example, as illustrated in FIG. 1A, HMD 112A includes inside-out cameras 108A and 108B (collectively, "inside-out cameras 108") configured to capture image data representative of the physical environment surrounding the user. HMD 112A also includes eye-tracking cameras 114A and 114B (collectively "eye-tracking cameras 114") configured to capture image data representative of a direction of the user's gaze. HMD 112A includes illuminators 116A and 116B (collectively "illuminators 116") positioned around or proximate to the eyepieces of rigid frame front 102. Illuminators 116 may comprise an array of light-emitting diodes (LEDs) or other sources of light, e.g., invisible light such as infrared light, used to illuminate the user's eyes for purposes of gaze-tracking by eye-tracking cameras 114. In other examples, HMD 112A may include additional image capture devices, including one or more glabella cameras configured to capture image data used to determine a distance between the rigid frame front 102 of HMD 112 and the user's forehead, one or more mouth cameras configured to capture image data of the user's mouth used for speech recognition, and/or one or more lower temporal cameras configured to capture image data used to determine a distance between arms 104 of HMD 112A and side areas of the user's face.

As shown in FIG. 1A, HMD 112A includes an internal control unit 110, which may include an internal power source, e.g., a rechargeable battery, and one or more printed-circuit boards having one or more processors, memory, and hardware to provide an operating environment for executing programmable operations to process sensed data and present artificial reality content on display 103. Internal control unit 110 of HMD 112A is described in more detail with respect to FIGS. 3 and 5.

As described in this disclosure, portable docking station 120A is configured to receive HMD 112A for calibration of one or more components of HMD 112A. For example, portable docking station 120A may be used to calibrate one or more of inside-out cameras 108 and eye-tracking cameras 114 of HMD 112A. In additional examples, portable docking station 120A may be used to calibrate one or more of electronic display 103, sensors 106, or illuminators 116. In some examples, the components of HMD 112A may exhibit drift of key parameters over their lifetime, which may lead to an undesirable degradation of performance of the entire HMD 112A. Although HMDs could be re-calibrated at a factory or manufacturing center where the components may have been initially calibrated, this is rarely done in practice due to associated shipping and re-calibration costs. Furthermore, the performance degradation of the components of HMDs may be rather slow and go unnoticed for extended periods of time such that it may be difficult for a user to determine when re-calibration becomes necessary. Portable docking station 120A described herein enables calibration or re-calibration of the components of HMD 112A outside of the factory or manufacturing center. In this way, portable docking station 120A and the calibration techniques described herein may determine parameters of the components of HMD 112A and adjust the parameters to correct for changes from the initial calibration settings, which may occur as the materials and parameters of the components of HMD 112A change over time.

In one example, as illustrated in FIG. 1A, portable docking station 120A comprises a box form factor having a bottom and four sides and being sized to receive HMD 112A. Although not shown in FIG. 1A, portable docking station 120A may include a removable top cover used to fully enclose HMD 112A within portable docking station 120A. In some examples, portable docking station 120A may further include a handle or strap in order to be used as a carrying case for HMD 112A. Although the example portable docking stations are described herein as having a box form factor that partially or fully encloses an HMD, in other examples, a portable docking station may instead comprise a stand having one or more supports to receive an HMD relative to one or more calibration targets.

In some implementations, portable docking station 120A may be configured to provide access to a power supply used to recharge HMD 112A when placed in portable docking station 120A. For example, portable docking station 120A may include its own battery and/or may be plugged into an electrical wall outlet or other external power supply. Portable docking station 120A may then provide a charging current to the rechargeable battery of HMD 112A via either wired charging or wireless (i.e., inductive) charging. In this way, the components of HMD 112A may be calibrated during or immediately after charging so as to not create an additional maintenance step for the user of HMD 112A. In some examples, the calibration of the components of HMD 112A may be triggered upon determining that HMD 112A has been received by portable docking station 120A and/or determining that the rechargeable battery of HMD 112A is charged to at least a threshold charge level while HMD 112A is within portable docking station 120A.

In the example of FIG. 1A, portable docking station 120A includes fixtures 124A and 124B (collectively "fixtures 124") and a nose rest 126 configured to receive and hold HMD 112A in a fixed position within portable docking station 120A. Fixtures 124 may comprise magnets or structural features configured to engage with a portion of arms 104 of HMD 112A to hold HMD 112A in the fixed position. Similarly, in some examples, nose rest 126 may comprise magnets or structural features configured to engage with a portion of the nose bridge of rigid frame front 102 of HMD 112A. Portable docking station 120A also includes calibration target 122A as a checkerboard pattern on the interior back surface directly behind arms 104 of HMD 112A and calibration target 122B as a checkerboard pattern on the interior front surface directly in front of rigid frame front 102 of HMD 112A. In some examples, additional calibration targets may be included on the left and right interior surfaces of portable docking station 120A. Calibration targets 122A, 122B are positioned in portable docking station 120A so as to be within a field of view of at least one image capture device of HMD 112A, e.g., at least one of inside-out cameras 108 or eye-tracking cameras 114, when HMD 112A is placed in portable docking station 120A. In some examples, the checkerboard patterns of calibration targets 122A, 122B may comprise reflective surfaces and/or infrared (IR) emitters. In still other examples, portable docking station 120A may include diffuse IR emitters, e.g., diffuse IR LEDs, to illuminate calibration targets 122A, 122B.

Although calibration targets 122A, 122B are illustrated in FIG. 1A as checkboard patterns, in other examples, portable docking station 120A may include other calibration targets having different visual patterns. Checkerboard patterns, or more generally any test patterns comprising an array of dots or other visual markers such as lines, crosshairs, polygons, circles, ovals, or the like, may be used for calibration of focusing, image resolution, and/or image distortion of various image capture devices of HMD 112A. In some examples, portable docking station 120A may include other types of calibration targets, such as IR emitters and/or reflective surfaces such as convex reflectors. As described in more detail with respect to FIG. 6, convex reflectors comprise mirrored convex surfaces that may be positioned directly behind the eyepieces of an HMD to mimic a user's eyes for calibration purposes.

According to the techniques described in this disclosure, an image capture device of HMD 112A is calibrated based on one or more images of calibration targets 122A, 122B captured by the image capture device when HMD 112A is placed in portable docking station 120A. A calibration engine, executed on HMD 112A or a peripheral device associated with HMD 112A, may perform the calibration by determining intrinsic and/or extrinsic parameters of the image capture device based on the captured images of calibration targets 122A, 122B and a known spatial relationship between the fixed position of HMD 112A and the position of calibration targets 122A, 122B within portable docking station 120A. The calibration engine may then configure or re-configure the image capture device to operate according to the determined parameters.

As one example, eye-tracking cameras 114 of HMD 112A may be calibrated based on the known spatial relationship between the fixed position of HMD 112A and the position of calibration target 122A within portable docking station 120A. As described in more detail with respect to FIG. 6, eye-tracking cameras 114 are positioned within the eyepieces of HMD 112A so as to capture images of a hot mirror reflection of the user's eyes when wearing HMD 112A. In this way, when HMD 112A is placed in portable docking station 120A, eye-tracking cameras 114 are able to capture images of calibration target 122A positioned behind the eyepieces of HMD 112A. In some examples, eye-tracking cameras 114 may be positioned within the eyepieces of HMD 112A so as to also capture images of electronic display 103 as well as illuminators 116 and calibration target 122B positioned in front of the eyepieces of HMD 112A. In order to calibrate eye-tracking camera 114A, for example, the calibration engine may determine intrinsic parameters of eye-tracking camera 114A based on images of the checkerboard pattern of calibration target 122A captured by eye-tracking camera 114A and the known spatial relationship between the fixed position of HMD 112A and the position of calibration target 122A. Continuing the example, the calibration engine may determine extrinsic parameters of eye-tracking camera 114A based on images of light emitted by illuminator 116A and reflected by a convex reflector (not shown in FIG. 1A) captured by eye-tracking camera 114A and a known spatial relationship between the fixed position of HMD 112A and a position of the convex reflector calibration target. The calibration engine may then configure eye-tracking camera 114A to operate according to the determined intrinsic and extrinsic parameters.

As another example, inside-out cameras 108 of HMD 112A may be calibrated based on a known spatial relationship between the fixed position of HMD 112A and the position of calibration target 122B within portable docking station 120A. In order to calibrate inside-out camera 108A, for example, the calibration engine may at least determine intrinsic parameters of inside-out camera 108A based on images of the checkerboard pattern of calibration target 122B captured by inside-out camera 108A and the known spatial relationship between the fixed position of HMD 112A and the position of calibration target 122B, and then configure inside-out camera 108A to operate according to the determined intrinsic parameters.

In further examples, the calibration engine may calibrate one or more of electronic display 103, illuminators 116, or sensors 106 with respect to at least one of the image capture devices of HMD 112A. For example, the calibration engine may calibrate electronic display 103 based on one or more images produced on electronic display 103 that are captured by one or more reference cameras (not shown in FIG. 1A) included in portable docking station 120A that are positioned directly behind the eyepieces of HMD 112 to mimic a user's eyes for calibration purposes. In some examples, illuminators 116 may be positioned directly on electronic display 103 such that illuminators 116 are within a field of view of both eye-tracking cameras 114 and the reference cameras used to calibrate electronic display 103.

FIG. 1B is an illustration depicting HMD 112B received within portable docking station 120B. HMD 112B may include components substantially similar to those of HMD 112A from FIG. 1A and the same reference numbers for the components of HMD 112A will be used with respect to HMD 112B.

As illustrated in FIG. 1B, HMD 112B includes calibration targets 130A and 130B (collectively "calibration targets 130") and fiducial marks 132A-132D (collectively "fiducial marks 132") positioned along arms 104 of HMD 112B. Calibration targets 130 are positioned at locations along arms 104 of HMD 112B so as to be within a field of view of eye-tracking cameras 114 of HMD 112B when the arms 104 are folded for placement of HMD 112B in portable docking station 120B. In the example of FIG. 1B, fiducial marks 132A and 132B are positioned adjacent to calibration target 130A on arm 104A of HMD 112B and fiducial marks 132C and 132D are positioned adjacent to calibration target 130B on arm 104B of HMD 112B. Although illustrated in FIG. 1B as having a round target-like pattern, this is just one example pattern, shape, or form factor of fiducial marks. In other examples fiducial marks 132 may comprise a non-round pattern, shape, or form factor. In still other examples, one or more fiducial marks may be embedded within calibration targets 130. The positions of fiducial marks 132 may ensure that at least one of fiducial marks 132 is within the field of view of eye-tracking cameras 114 along with a respective one of calibration targets 130.

Portable docking station 120B may be substantially similar to portable docking station 120A from FIG. 1A. As illustrated in FIG. 1B, portable docking station 120B includes fixtures 124 and nose rest 126 configured to receive and hold HMD 112B in a fixed position relative portable docking station 120B. Portable docking station 120B also includes a calibration target 128 as a checkerboard pattern on the interior front surface of portable docking station 120B directly in front of rigid frame front 102 of HMD 112B. As illustrated in FIG. 1B, portable docking station 120B may not have a calibration target on the interior back surface if intended for use with HMD 112B having calibration targets 130. In other examples, portable docking station 120B may include additional calibration targets on the back, left, and/or right interior surfaces.

As described above with respect to FIG. 1A, inside-out cameras 108 of HMD 112B may be calibrated based on a known spatial relationship between the fixed position of HMD 112B and the position of calibration target 128 within portable docking station 120B. For example, a calibration engine, executed on HMD 112B or a peripheral device associated with HMD 112B, may at least determine intrinsic parameters of inside-out camera 108A based on images of the checkerboard pattern of calibration target 128 captured by inside-out camera 108A and the known spatial relationship between the fixed position of HMD 112B and the position of calibration target 128, and then configure inside-out camera 108A to operate according to the determined intrinsic parameters.

With respect to calibration of eye-tracking cameras 114 of HMD 112B, however, rigid frame front 102 and arms 104 of HMD 112B may flex and/or warp over time and with repeated use. As such, even though HMD 112B is held at a fixed position relative to portable docking station 120B, the spatial relationship between eye-tracking cameras 114 within the eyepieces of rigid frame front 102 of HMD 112B and calibration targets 130 on arms 104 of HMD 112B is likely to change over time. In this example, the calibration engine determines the spatial relationship between a position of eye-tracking camera 114A, for example, within rigid frame front 102 and calibration target 130A on arm 104A based on one or more of fiducial marks 132A, 132B. The calibration engine then calibrates eye-tracking camera 114A based the determined spatial relationship between the position of eye-tracking camera 114A in rigid frame front 102 and the position of calibration target 130A on arm 104A. For example, the calibration engine may at least determine intrinsic parameters of eye-tracking camera 114A based on images of the checkerboard pattern of calibration target 130A captured by eye-tracking camera 114A and the determined spatial relationship between the position of eye-tracking camera 114A and the position of calibration target 130A, and then configure eye-tracking camera 114A to operate according to the determined intrinsic parameters.

FIG. 1C is an illustration depicting HMD 112A received within portable docking station 120C. In this example, HMD 112A of FIG. 1C may be substantially the same as HMD 112A of FIG. 1A. Moreover, portable docking station 120C may be substantially similar to portable docking station 120A from FIG. 1A.

As illustrated in FIG. 1C, portable docking station 120C includes calibration target 122A as a checkerboard pattern on the interior back surface directly behind arms 104 of HMD 112A and calibration target 122B as a checkerboard pattern on the interior front surface directly in front of rigid frame front 102 of HMD 112A. Unlike docking stations 120A and 120B of FIGS. 1A and 1B, however, portable docking station 120C does not include any fixtures configured to receive and hold HMD 112A in a fixed position within portable docking station 120C. Instead, portable docking station 120C includes fiducial marks 138A on the interior back surface directly behind arms 104 of HMD 112A and fiducial marks 138B on the interior front surface directly in front of rigid frame front 102 of HMD 112A.

In this example, HMD 112A may be placed freely in portable docking station 120C and fiducial marks 138A, 138B may be used to determine the position of HMD 112A with respect to portable docking station 120C. More specifically, fiducial marks 138A, 138B may be used to determine a spatial relationship between the position of HMD 112A when placed in portable docking station 120C and positions of respective calibration targets 122A, 122B within portable docking station 120C. In the example of FIG. 1C, fiducial marks 138A are positioned adjacent to calibration target 122A and fiducial marks 138B are positioned adjacent to calibration target 122B. Although illustrated in FIG. 1C as having a round target-like pattern, this is just one example pattern, shape, or form factor of fiducial marks. In other examples one or more of fiducial marks 138A, 138B may comprise a non-round pattern, shape, or form factor. In still other examples, one or more fiducial marks may be embedded within calibration targets 122A, 122B. In some examples, portable docking station 120C may include diffuse IR emitters, e.g., diffuse IR LEDs, to illuminate both calibration targets 122A, 122B and fiducial marks 138A, 138B. The positions of fiducial marks 138A may ensure that at least one of fiducial marks 138A is within the field of view of eye-tracking cameras 114 along with calibration target 122A. Similarly, the positions of fiducial marks 138B may ensure that at least one of fiducial marks 138B is within the field of view of inside-out cameras 108 along with calibration target 122B.

As one example, in order to calibrate eye-tracking camera 114A, for example, the calibration engine determines the spatial relationship between the position of HMD 112A and the position of calibration target 122A within portable docking station 120C based on one or more of fiducial marks 138A. The calibration engine may at least determine intrinsic parameters of eye-tracking camera 114A based on images of the checkerboard pattern of calibration target 122A captured by eye-tracking camera 114A and the determined spatial relationship between the position of HMD 112A and the position of calibration target 122A, and then configure eye-tracking camera 114A to operate according to the determined intrinsic parameters.

As another example, in order to calibrate inside-out camera 108A, for example, the calibration engine determines the spatial relationship between the position of HMD 112A and the position of calibration target 122B within portable docking station 120C based on one or more of fiducial marks 138B. The calibration engine may at least determine intrinsic parameters of inside-out camera 108A based on images of the checkerboard pattern of calibration target 122B captured by inside-out camera 108A and the determined spatial relationship between the position of HMD 112A and the position of calibration target 122B, and then configure inside-out camera 108A to operate according to the determined intrinsic parameters.

Figure 2:
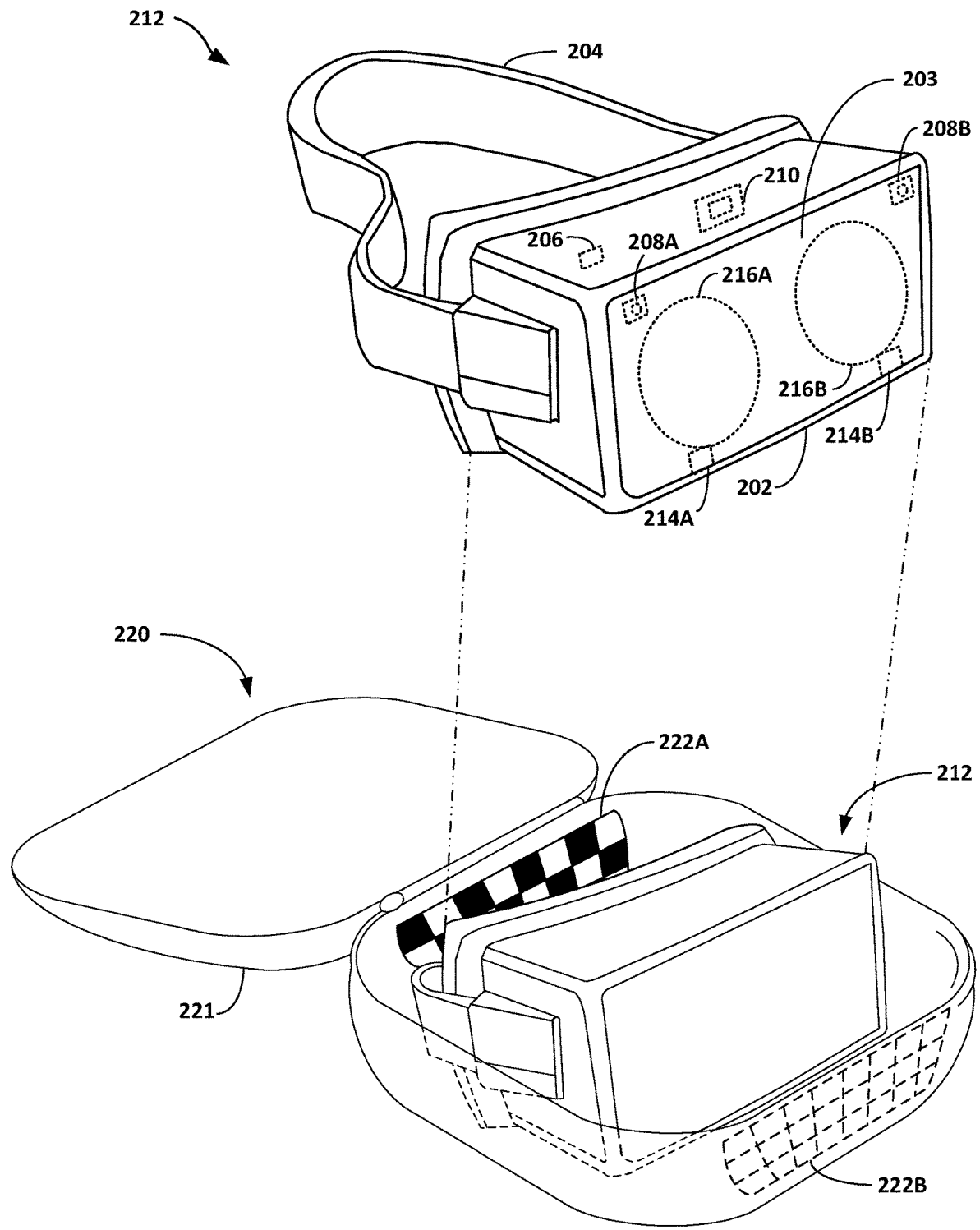
FIG. 2 is an illustration depicting an example HMD having a headset form factor and an example portable docking station configured to receive the HMD for calibration, in accordance with the techniques of the disclosure.

FIG. 2 is an illustration depicting an example HMD 212 having a headset form factor and an example portable docking station 220 configured to receive HMD 212 for calibration, in accordance with the techniques of the disclosure. Similar to HMDs 112A, 112B described with respect to FIGS. 1A-1C, HMD 212 may operate as a stand-alone, mobile artificial realty system, or may be part of an artificial reality system that includes a peripheral device and/or a console.

In the example of FIG. 2, HMD 212 comprises a headset form factor that includes a rigid body 202 and a band 204 to secure HMD 212 to a user. In addition, HMD 212 includes an interior-facing electronic display 203 configured to present artificial reality content to the user. Electronic display 203 may be any suitable display technology, such as LCD, quantum dot display, dot matrix displays, LED displays, OLED displays, CRT displays, waveguide displays, e-ink, or monochrome, color, or any other type of display capable of generating visual output. In some examples, the electronic display is a stereoscopic display for providing separate images to each eye of the user. In some examples, the known orientation and position of display 203 relative to a front-portion of rigid body 202 of HMD 212 is used as a frame of reference, also referred to as a local origin, when tracking the position and orientation of HMD 212 for rendering artificial reality content according to a current viewing perspective of HMD 212 and the user.

As further shown in FIG. 2, in this example HMD 212 further includes one or more motion sensors 206, such as one or more accelerometers or IMUs that output data indicative of current acceleration of HMD 212, GPS sensors that output data indicative of a location of HMD 212, radar or sonar that output data indicative of distances of HMD 212 from various objects, or other sensors that provide indications of a location or orientation of HMD 212 or other objects within a physical environment.

Moreover, HMD 212 may include one or more integrated image capture devices, such as video cameras, laser scanners, Doppler® radar scanners, depth scanners, or the like. For example, as illustrated in FIG. 2, HMD 212 includes inside-out cameras 208A and 208B (collectively, "inside-out cameras 208") configured to capture image data representative of the physical environment surrounding the user. HMD 212 also includes eye-tracking cameras 214A and 214B (collectively "eye-tracking cameras 214") configured to capture image data representative of a direction of the user's gaze. HMD 212 includes illuminators 216A and 216B (collectively "illuminators 216") positioned around or proximate to eyepieces within rigid body 202. Illuminators 216 may comprise an array of LEDs or other sources of light, e.g., invisible light such as infrared light, used to illuminate the user's eyes for purposes of gaze-tracking by eye-tracking cameras 214. In other examples, HMD 212 may include additional image capture devices, including one or more glabella cameras configured to capture image data used to determine a distance between a front-portion of rigid body 202 of HMD 212 and the user's forehead, one or more mouth cameras configured to capture image data of the user's mouth used for speech recognition, and/or one or more lower temporal cameras configured to capture image data used to determine a distance between side-portions of rigid body 202 of HMD 212 and side areas of the user's face.

As shown in FIG. 2, HMD 212 includes an internal control unit 210, which may include an internal power source, e.g., a rechargeable battery, and one or more printed-circuit boards having one or more processors, memory, and hardware to provide an operating environment for executing programmable operations to process sensed data and present artificial reality content on display 203.

Portable docking station 220 may operate substantially similar to any of portable docking stations 120A-120C from FIGS. 1A-1C. As described in this disclosure, portable docking station 220 is configured to receive HMD 212 for calibration of one or more components of HMD 212. As illustrated in FIG. 2, portable docking station 220 comprises a box form factor having a bottom and four sides and being sized to receive HMD 212. As shown in FIG. 2, portable docking station 220 includes a removable top cover 221 used to fully enclose HMD 212 within portable docking station 220. In some examples, portable docking station 220 may further include a handle or strap in order to be used as a carrying case for HMD 212. Portable docking station 220 may also provide access to a power supply used to recharge HMD 212 when placed in portable docking station 220 via either wired charging or wireless (i.e., inductive) charging. In some examples, the calibration of the components of HMD 212 may be triggered upon determining that HMD 212 has been received by portable docking station 220 and/or determining that the rechargeable battery of HMD 212 is charged to at least a threshold charge level while HMD 212 is within portable docking station 220.

As illustrated in FIG. 2, portable docking station 220 includes calibration target 222A as a checkerboard pattern on the interior back surface directly behind rigid body 202 of HMD 212 and calibration target 222B as a checkerboard pattern on the interior front surface directly in front of rigid body 202 of HMD 212. In some examples, additional calibration targets may be included on the left and right interior surfaces of portable docking station 220. Calibration targets 222A, 222B are positioned in portable docking station 220 so as to be within a field of view of at least one image capture device of HMD 212, e.g., at least one of inside-out cameras 208 or eye-tracking cameras 214, when HMD 212 is placed in portable docking station 220. Although calibration targets 222A, 222B are illustrated in FIG. 2 as checkerboard patterns, in other examples, portable docking station 220 may include other types of calibration targets, such as different visual patterns or convex reflectors.

In one example, portable docking station 220 may include one or more fixtures (not shown in FIG. 2) configured to receive and hold HMD 212 in a fixed position within portable docking station 220. In this example, a calibration engine, executed on HMD 212 or a peripheral device associated with HMD 212, may perform calibration of an image capture device of HMD 212 (e.g., inside-out camera 208A, 208B or eye-tracking camera 214A, 214B) by determining intrinsic and/or extrinsic parameters of the image capture device based on captured images of calibration targets 222A, 222B and a known spatial relationship between the fixed position of HMD 212 and the position of calibration targets 222A, 222B within portable docking station 220. The calibration engine then configures the image capture device of HMD 212 to operate according to the determined parameters.

In other examples, portable docking station 220 may not include any fixtures configured to receive and hold HMD 212 in a fixed position within portable docking station 220. Instead, portable docking station 220 may include one or more fiducial marks (not shown in FIG. 2) positioned adjacent to or embedded within calibration targets 222A, 222B. In this example, the calibration engine is configured to use the fiducial marks to determine a spatial relationship between the position of HMD 212 when placed in portable docking station 220 and positions of respective calibration targets 222A, 222B within portable docking station 220. The calibration engine may then perform calibration of an image capture device of HMD 212 by determining intrinsic and/or extrinsic parameters of the image capture device based on captured images of calibration targets 222A, 222B and the determined spatial relationship between the position of HMD 212 and the position of calibration targets 222A, 222B within portable docking station 220. The calibration engine then configures the image capture device of HMD 212 to operate according to the determined parameters.

Figure 3:
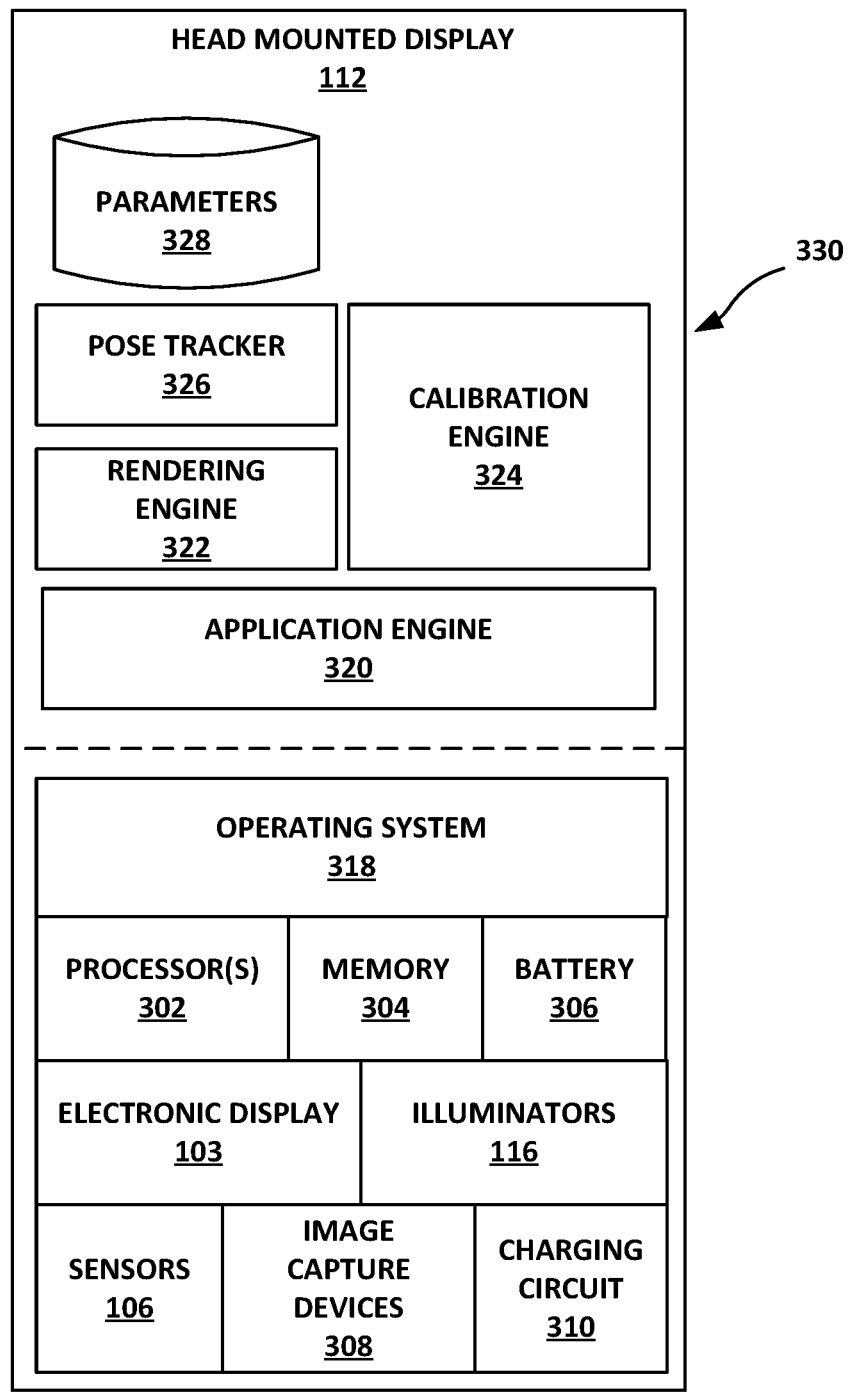
FIG. 3 is a block diagram illustrating an example implementation of the HMD of FIGS. 1A-1C operating as a stand-alone, mobile artificial reality system.

FIG. 3 is a block diagram illustrating an example implementation of HMD 112 (e.g., HMD 112A or 112B) of FIGS. 1A-1C operating as a stand-alone, mobile artificial reality system. In this example, HMD 112 includes one or more processors 302 and memory 304 that, in some examples, provide a computer platform for executing an operating system 318, which may be an embedded, real-time multitasking operating system, for instance, or another type of operating system. In turn, operating system 318 provides a multitasking operating environment for executing one or more software components 330. In some examples, processors 302 and memory 304 may be separate, discrete components. In other examples, memory 304 may be on-chip memory collocated with processors 302 within a single integrated circuit. Processors 302 may comprise any one or more of a multi-core processor, a controller, a digital signal processor (DSP), an application specific integrated circuit (ASIC), a field-programmable gate array (FPGA), or equivalent discrete or integrated logic circuitry. Memory 304 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

As illustrated in FIG. 3, processors 302 are coupled to electronic display 103, sensors 106, image capture devices 308 (e.g., inside-out cameras 108 and/or eye-tracking cameras 114), and illuminators 116. HMD 112 further includes a rechargeable battery 306 coupled to a charging circuit 310. Charging circuit 310 is configured to receive a charging current via either a wired or wireless (i.e., inductive) connection and use the received current to recharge battery 306.

Software components 330 operate to provide an overall artificial reality application. In this example, software applications 330 include application engine 320, rendering engine 322, pose tracker 326, and calibration engine 324. In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on HMD 112.

Application engine 320 and rendering engine 322 construct the artificial content for presentation to a user of HMD 112 in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the real-world 3D environment of the user. During this process, pose tracker 326 operates on sensed data, such as movement information and user commands, and, in some examples, data from any external sensors, such as external cameras, to capture 3D information within the real world environment, such as motion and/or feature tracking information with respect to the user of HMD 112. Based on the sensed data, pose tracker 326 determines a current pose for the frame of reference of HMD 112 and, in accordance with the current pose, rendering engine 322 constructs the artificial reality content for presentation to the user on electronic display 103.

In accordance with the disclosed techniques, calibration engine 324 is configured to perform calibration of one or more components of HMD 112 based on one or more images of a calibration target captured by image capture devices 308 when HMD 112 is placed in a portable docking station, e.g., any of portable docking stations 120A-120C from FIGS. 1A-1C. For example, calibration engine 324 may be configured to perform calibration of one or more of image capture devices 308 (e.g., inside-out cameras 108 and/or eye-tracking cameras 114), electronic display 103, sensors 106, and/or illuminators 116. Calibration engine 324 performs the calibration by determining intrinsic and/or extrinsic parameters 328 of the respective components, and configuring the respective components to operate according to the determined parameters.

In one or more aspects, parameters 328 of the components of HMD 112 (e.g., image capture devices 308, electronic display 103, sensors 106, and illuminators 116) may be stored in a database, a map, a search tree, or any other data structure. For example, parameters 328 may include camera parameters for each of image capture devices 308 of HMD 112. The camera parameters may be estimated based on a correspondence between 3D real-world coordinates and 2D image coordinates that is determined using multiple images of a calibration pattern, e.g., a checkerboard pattern. Camera parameters may include intrinsic and extrinsic parameters, and in some cases lens distortion parameters. The 3D real-world coordinates are transformed to 3D camera coordinates using extrinsic parameters and the 3D camera coordinates are mapped into the 2D image coordinates using the intrinsic parameters. Example extrinsic parameters of a camera include the rotation and translation used to transform from the 3D real-world coordinates to the 3D camera coordinates. Example intrinsic parameters of the camera may include the focal length (i.e., how strongly the camera converges or diverges light), the principal point (i.e., the position of the optical center), and the skew coefficient (i.e., the distortion of the image axes from perpendicular) used to map the 3D camera coordinates into the 2D image coordinates. In some examples, the parameters may also include lens distortion parameters (i.e., radial distortion at the edges of the lens and tangential distortion between the lens and the camera sensor image plane).

Calibration engine 324 may be triggered to perform calibration upon determining that HMD 112 has been received by a portable docking station and/or upon determining that rechargeable battery 306 is charged to at least a threshold charge level while HMD 112 is within the portable docking station. For example, calibration engine 324 may receive an indication that a portion of HMD 112 is engaged with or adjacent to a portion of the portable docking station. In this example, calibration engine 324 may receive the indication from a proximity sensor or a magnetic sensor included in HMD 112 and/or the portable docking station.

As another example, calibration engine 324 may receive an additional indication from charging circuit 310 that rechargeable battery 306 is charged to the threshold charge level.

In some examples, each time HMD 112 is placed in the portable docking station, calibration engine 324 is configured to automatically calibrate each of the components of HMD 112. In other examples, each time HMD 112 is placed in the portable docking station, calibration engine 324 may make a determination as to whether or not each of the components of HMD 112 needs to be calibrated. The calibration determination may be based on an amount of time since the last calibration and/or identified changes from initial calibration settings that occur as the materials and parameters of the components of HMD 112 change over time.

In the case of calibrating one of image capture devices 308, calibration engine 324 performs the calibration by determining intrinsic and/or extrinsic parameters 328 of the one of image capture devices 308 based on captured images of a calibration target and a spatial relationship between a position of HMD 112 and a position of the calibration target within the portable docking station. Calibration engine 324 may be configured to update or adjust the parameters to correct for changes from initial calibration settings of the one of image capture device 308. Calibration engine 324 then configures the one of image capture devices 308 to operate according to the determined parameters.

In order to determine the parameters, calibration engine 324 may determine the spatial relationship between the position of HMD 112 and the position of the calibration target within the portable docking station. In examples where the portable docking station includes fixtures to receive and hold the HMD in a fixed position (e.g., portable docking station 120A, 120B from FIGS. 1A, 1B), the spatial relationship is a known spatial relationship. In other examples where the portable docking station does not includes fixtures (e.g., portable docking station 120C from FIG. 1C), calibration engine 324 may determine the spatial relationship between the position of HMD 112 and the position of the calibration target within the portable docking station based on one or more fiducial marks adjacent to or embedded within the calibration target. Upon calibration of the one of image capture devices 308, calibration engine 326 stores the updated intrinsic and/or extrinsic parameters 328 of the one of image capture devices 308. Calibration engine 324 may then further calibrate electronic display 103, one of illuminators 116, or one of sensors 106 with respect to the one of image capture devices 308. For example, calibration engine 324 may calibrate electronic display 103, one of illuminators 116, or one of sensors 106 based on images of a calibration target captured by the previously calibrated one of image capture devices 308.

Figure 4:
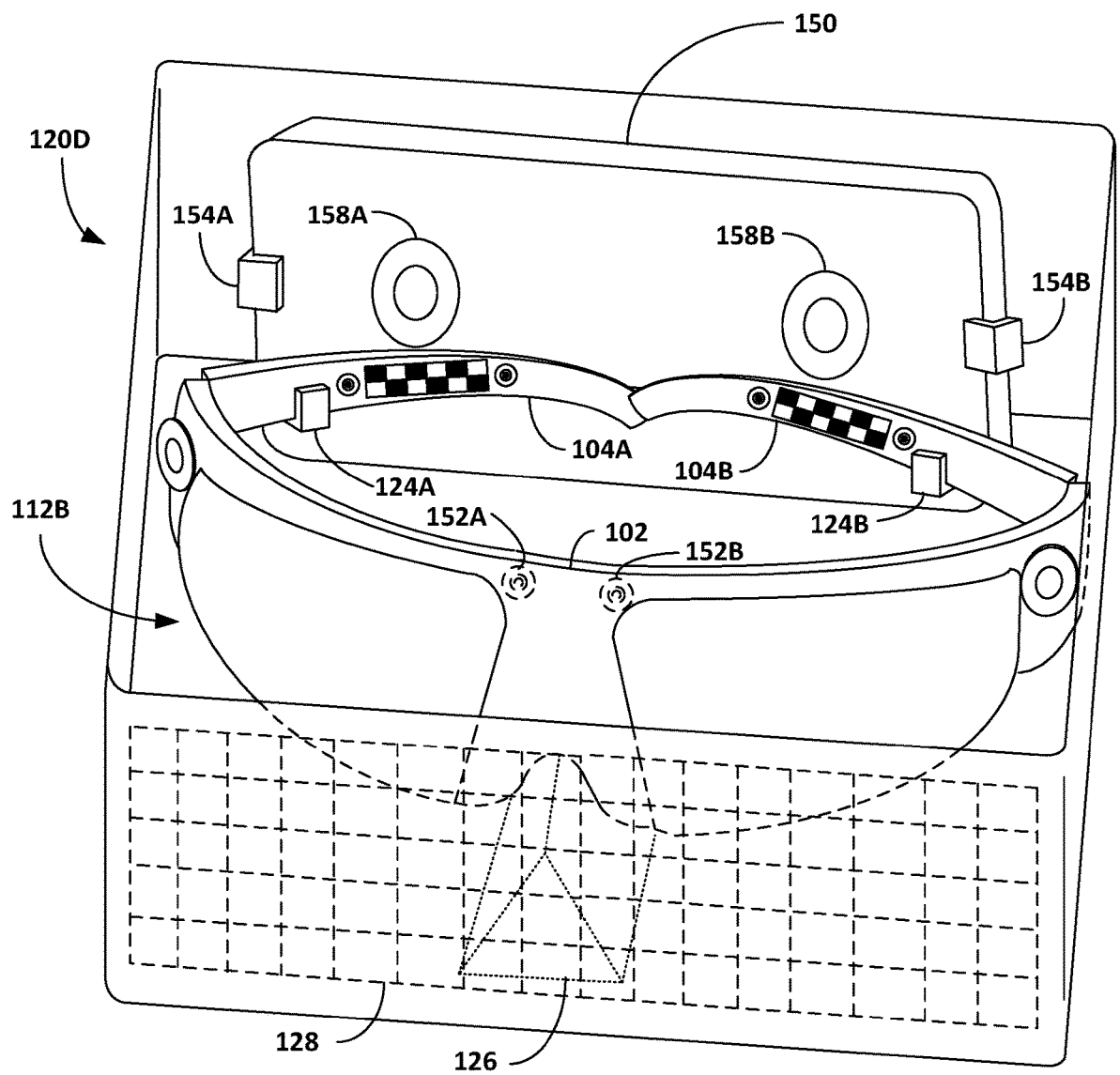
FIG. 4 is an illustration depicting an example HMD having an eyeglass form factor, an example peripheral device, and an example portable docking station configured to receive the HMD and the peripheral device for calibration, in accordance with the techniques of the disclosure.

FIG. 4 is an illustration depicting an example HMD 112B having an eyeglass form factor, an example peripheral device 150, and an example portable docking station 120D configured to receive the HMD and the peripheral device for calibration, in accordance with the techniques of the disclosure. HMD 112B of FIG. 4 is the same as HMD 112B of FIG. 1B. In the example of FIG. 4, HMD 112B is part of an artificial reality system that includes peripheral device 150. The artificial reality system uses information captured from a real-world, 3D physical environment to render artificial reality content for display to a user of HMD 112B. Peripheral device 150 coexists with HMD 112B and, in some examples, operates as an auxiliary input/output device for HMD 112B in a virtual environment. Peripheral device 150 may operate as an artificial reality co-processing device to which some of the functions of HMD 112B are offloaded. In some examples, peripheral device 150 may be a smartphone, tablet, or other hand-held device.

Peripheral device 150 may include one or more motion sensors (e.g., accelerometers, IMUs, GPS sensors, radar, sonar, and the like) that provide indications of a location or orientation of peripheral device 150 or other objects within a physical environment. In addition, peripheral device 150 may include a presence-sensitive surface, such as a surface that uses capacitive, conductive, resistive, acoustic, or other technology to detect touch and/or hover input. In some examples, the surface of peripheral device 150 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). Peripheral device 150 may also include one or more integrated image capture devices configured to capture image data representative of the physical environment. As illustrated in FIG. 4, peripheral device 150 includes reference cameras 158A and 158B (collectively, "reference cameras 158").

Portable docking station 120D may be substantially similar to portable docking station 120B from FIG. 1B. Portable docking station 120D includes fixtures 124 and nose rest 126 configured to receive and hold HMD 112B in a fixed position relative portable docking station 120D. Portable docking station 120D also includes calibration target 128 as a checkerboard pattern on the interior front surface of portable docking station 120D directly in front of rigid frame front 102 of HMD 112B.

In some implementations, portable docking station 120D may be configured to provide access to a power supply used to recharge HMD 112B and peripheral device 150 when placed in portable docking station 120D. For example, portable docking station 120D may include its own battery and/or may be plugged into an electrical wall outlet or other external power supply. Portable docking station 120D may then provide a charging current to the rechargeable battery of HMD 112B and/or to a rechargeable battery of peripheral device 150 via either wired charging or wireless (i.e., inductive) charging. In an alternative example, peripheral device 150 may comprise a power supply used to recharge HMD 112B when both HMD 112B and peripheral device 150 are placed in portable docking station 120D.

As illustrated in FIG. 4, portable docking station 120D further includes fixtures 154A and 154B (collectively "fixtures 154") configured to receive and hold peripheral device 150 in a fixed position relative to portable docking station 120D. Fixtures 154 may comprise magnets or structural features configured to engage with a portion of the edges of peripheral device 150 to hold peripheral device 150 in the fixed position. When both HMD 112B and peripheral device 150 are held in their fixed positions within portable docking station 120D, reference cameras 158 of peripheral device 150 may be positioned directly behind the eyepieces of rigid frame front 102 of HMD 112B to mimic a user's eyes. In this way, electronic display 103 of HMD 112B is within a field of view of reference cameras 158 of peripheral device 150 when both HMD 112B and peripheral device 150 are placed in portable docking station 120D, and reference cameras 158 may be configured to capture image data representative of a user's view of electronic display 103 of HMD 112B. In some examples, illuminators 116 may be positioned directly on electronic display 103 such that illuminators 116 are within a field of view of both eye-tracking cameras 114 of HMD 112B and reference cameras 158 of peripheral device 150 when both HMD 112B and peripheral device 150 are placed in portable docking station 120D. In these examples, the images captured by reference cameras 158 include both illuminators 116 and the images produced on electronic display 103.

As described above with respect to FIG. 1B, inside-out cameras 108 of HMD 112B may be calibrated based on a known spatial relationship between the fixed position of HMD 112B and the position of calibration target 128 within portable docking station 120D. For example, a calibration engine, executed on HMD 112B or peripheral device 150, may at least determine intrinsic parameters of inside-out camera 108A based on images of the checkerboard pattern of calibration target 128 captured by inside-out camera 108A and the known spatial relationship between the fixed position of HMD 112B and the position of calibration target 128. The calibration engine may then configure inside-out camera 108A to operate according to the determined parameters.

In addition, as described with respect to FIG. 1B, in order to calibrate eye-tracking camera 114A, for example, the calibration engine determines the spatial relationship between the position of eye-tracking camera 114A in rigid frame front 102 of HMD 112B and the position of calibration target 130A on arm 104A of HMD 112B based on one or more of fiducial marks 132A, 132B. For example, the calibration engine may at least determine intrinsic parameters of eye-tracking camera 114A based on images of the checkerboard pattern of calibration target 130A captured by eye-tracking camera 114A and the determined spatial relationship between the position of eye-tracking camera 114A and the position of calibration target 130A. The calibration engine may then configure eye-tracking camera 114A to operate according to the determined parameters.

Electronic display 103 of HMD 112B and/or reference cameras 158 of peripheral device 150 may be calibrated based on a known spatial relationship between the fixed position of HMD 112B and the fixed position of peripheral device 150. For example, the calibration engine may determine parameters of electronic display 103 of HMD 112B based on images produced on electronic display 103 that are captured by reference cameras 158 and the known spatial relationship between the fixed position of HMD 112B and the fixed position of peripheral device 150 when both HMD 112B and peripheral device 150 are placed in portable docking station 120D. The calibration engine may then configure electronic display 103 to operate according to the determined parameters.

In other examples, portable docking station 120D may not include fixtures configured to receive and hold peripheral device 150. In the example where peripheral device 150 may be placed freely in portable docking station 120D, HMD 112B may include one or more fiducial marks 152A, 152B positioned on the interior of rigid frame front 102 to ensure that at least one of fiducial marks 152A, 152B is within the field of view of reference cameras 158 of peripheral device 150 along with electronic display 103 of HMD 112B. The calibration engine determines the spatial relationship between the fixed position of HMD 112B and the position of peripheral device 150 based on one or more of fiducial marks 152A, 152B on HMD 112B. For example, the calibration engine may determine parameters of electronic display 103 of HMD 112B based on images produced on electronic display 103 that are captured by reference cameras 158 and the determined spatial relationship between the fixed position of HMD 112B and the position of peripheral device 150 when both HMD 112B and peripheral device 150 are placed in portable docking station 120D. The calibration engine may then configure electronic display 103 to operate according to the determined parameters.

Although illustrated in FIG. 4 as being used with HMD 112B from FIG. 1B having an eyeglass form factor with calibration targets 130 and fiducial marks 132 on arms 104, peripheral device 150 may be associated with any type of HMD, including any of HMD 112A from FIGS. 1A and 1C or HMD 212 from FIG. 2. In the example of HMD 112A, peripheral device 150 and HMD 112A may be stored, charged, and/or calibrated when placed in a portable docking station similar to portable docking station 120D but with additional calibration targets (not shown in FIG. 4) either included on a divider positioned between the HMD and peripheral device 150 within the portable docking station or included on peripheral device 150. In the example of HMD 212, peripheral device 150 and HMD 212 may be stored, charged, and/or calibrated when placed in a portable docking station similar to portable docking station 220 but with space and/or fixtures to receive peripheral device 150.

Figure 5:
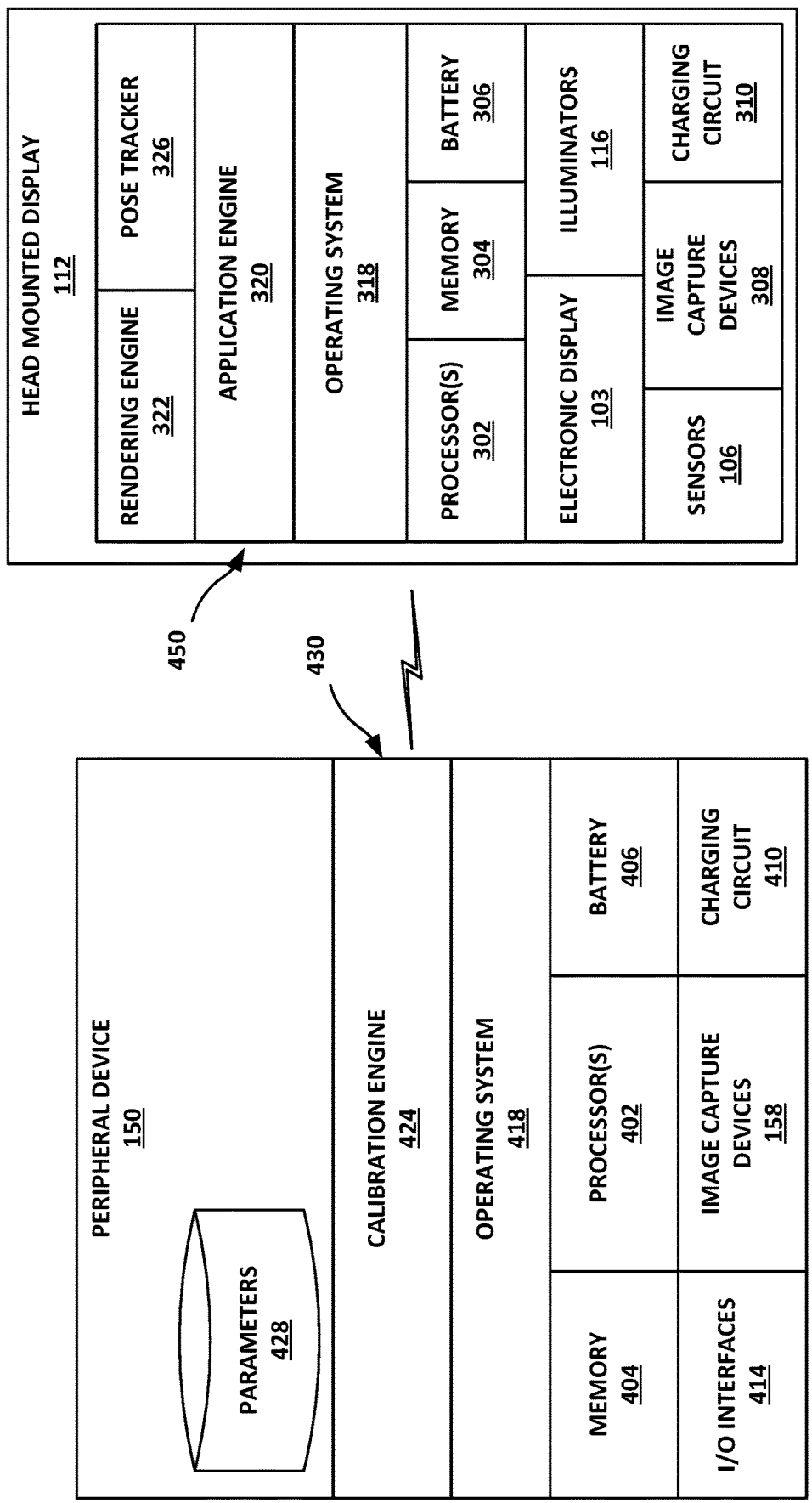
FIG. 5 is a block diagram illustrating an example implementation of the HMD and peripheral device of FIG. 4 operating as an artificial reality system in accordance with the techniques of the disclosure.

FIG. 5 is a block diagram illustrating an example implementation of HMD 112 and peripheral device 150 of FIG. 4 operating as an artificial reality system in accordance with the techniques of the disclosure. In this example, similar to FIG. 3, HMD 112 includes one or more processors 302 and memory 304 that, in some examples, provide a computer platform for executing an operating system 318, which may be an embedded, real-time multitasking operating system, for instance, or another type of operating system. In turn, operating system 318 provides a multitasking operating environment for executing one or more software components 450. Moreover, processors 302 are coupled to electronic display 103, sensors 106, image capture devices 308 (e.g., inside-out cameras 108 and/or eye-tracking cameras 114), and illuminators 116. HMD 112 further includes a rechargeable battery 306 coupled to a charging circuit 310, which is configured to receive a charging current via either a wired or wireless (i.e., inductive) connection and use the received current to recharge battery 306. In the example of FIG. 5, software components 450 operate to provide an overall artificial reality application. In this example, software applications 450 include application engine 320, rendering engine 322, and pose tracker 326. In various examples, software components 450 operate similar to the counterpart components 330 of FIG. 3.

As illustrated in FIG. 5, peripheral device 150 includes one or more processors 402 and memory 404 that, in some examples, provide a computer platform for executing an operating system 418, which may be an embedded, real-time multitasking operating system, for instance, or another type of operating system. In turn, operating system 418 provides a multitasking operating environment for executing one or more software components 430. In some examples, processors 402 and memory 404 may be separate, discrete components. In other examples, memory 404 may be on-chip memory collocated with processors 402 within a single integrated circuit. Processors 402 may comprise any one or more of a multi-core processor, a controller, a DSP, an ASIC, a FPGA, or equivalent discrete or integrated logic circuitry. Memory 404 may comprise any form of memory for storing data and executable software instructions, such as RAM, ROM, PROM, EPROM, EEPROM, and flash memory.

Peripheral device 150 may coexist with HMD 112 and, in some examples, operate as an auxiliary input/output device for HMD 112 in the virtual environment. For example, as illustrated in FIG. 5, processors 402 are coupled to one or more I/O interfaces 414 for communicating with external devices, such as a keyboard, game controllers, display devices, image capture devices, HMDs, and the like. Moreover, the one or more I/O interfaces 414 may include one or more wired or wireless network interface controllers (NICs) for communicating with a network. Processors 402 are also coupled to image capture devices 158. Peripheral device 150 further includes a rechargeable battery 406 coupled to a charging circuit 410, which is configured to receive a charging current via either a wired or wireless (i.e., inductive) connection and use the received current to recharge battery 406. In one or more aspects, peripheral device 150 may be a smartphone, tablet, or other hand-held device.

As described above with respect to FIG. 4, peripheral device 150 may operate as an artificial reality co-processing device to which some of the functions of HMD 112 are offloaded. In the example of FIG. 5, software components 430 of peripheral device 150 include calibration engine 424. Calibration engine 424 may operate similar to the counterpart component of calibration engine 324 of HMD 112 from FIG. 3 to perform calibration of one or more components of HMD 112. For example, calibration engine 424 of peripheral device 150 may be configured to perform calibration of one or more of image capture devices 308 (e.g., inside-out cameras 108 and/or eye-tracking cameras 114), electronic display 103, sensors 106, and/or illuminators 116 of HMD 112.

Similar to the examples described with respect to FIG. 3, calibration engine 424 is configured to perform calibration of one or more components of HMD 112 based on one or more images of a calibration target captured by image capture devices 308 of HMD 112 and/or image capture devices 158 of peripheral device 150. Calibration engine 424 may be triggered to perform calibration upon determining that one or both HMD 112 and peripheral device 150 have been received by a portable docking station and/or upon determining that one or both of rechargeable batteries 306, 406 of HMD 112 and peripheral device 150, respectively, are charged to at least a threshold charge level while HMD 112 and peripheral device 150 are within the portable docking station.

In the case of calibrating one of image capture devices 308 of HMD 112, calibration engine 424 performs the calibration by determining intrinsic and/or extrinsic parameters of the one of image capture devices 308 based on captured images of a calibration target and a spatial relationship between a position of HMD 112 and a position of the calibration target within the portable docking station. In the case of calibrating electronic display 103 of HMD 112, calibration engine 424 performs the calibration by determining intrinsic and/or extrinsic parameters of electronic display 103 based on images produced on display 103 that are captured by image capture devices 158 of peripheral device 150 and a spatial relationship between a position of HMD 112 and a position of peripheral device 150 within the portable docking station. Calibration engine 424 may be configured to update or adjust the parameters to correct for changes from initial calibration settings of the one of image capture device 308 and/or electronic display 103. Calibration engine 424 of peripheral device 150 then configures the one of image capture devices 308 and/or electronic display 103 of HMD 112 to operate according to the determined parameters.

In order to determine the camera parameters, calibration engine 424 may determine the spatial relationship between the position of HMD 112, the position of peripheral device 150, and/or the position of the calibration target within the portable docking station. In examples where the portable docking station includes fixtures to receive and hold the HMD and the peripheral device in a fixed position (e.g., portable docking station 120D from FIG. 4), the spatial relationship is a known spatial relationship. In other examples, calibration engine 424 may determine the spatial relationship between the position of HMD 112 and the position of peripheral device 150 when both HMD 112 and peripheral device 150 are placed in the portable docking station based on one or more fiducial marks 152 included on HMD 112.

Upon calibration of the one of image capture devices 308 and/or electronic display 103 of HMD 112, calibration engine 426 of peripheral device 150 stores the updated intrinsic and/or extrinsic parameters 428 of the one of image capture devices 308 and/or electronic display 103. Calibration engine 424 may then further calibrate one of illuminators 116 and/or one of sensors 106 based on images of a calibration target captured by the previously calibrated one of image capture devices 308.

Figure 6:
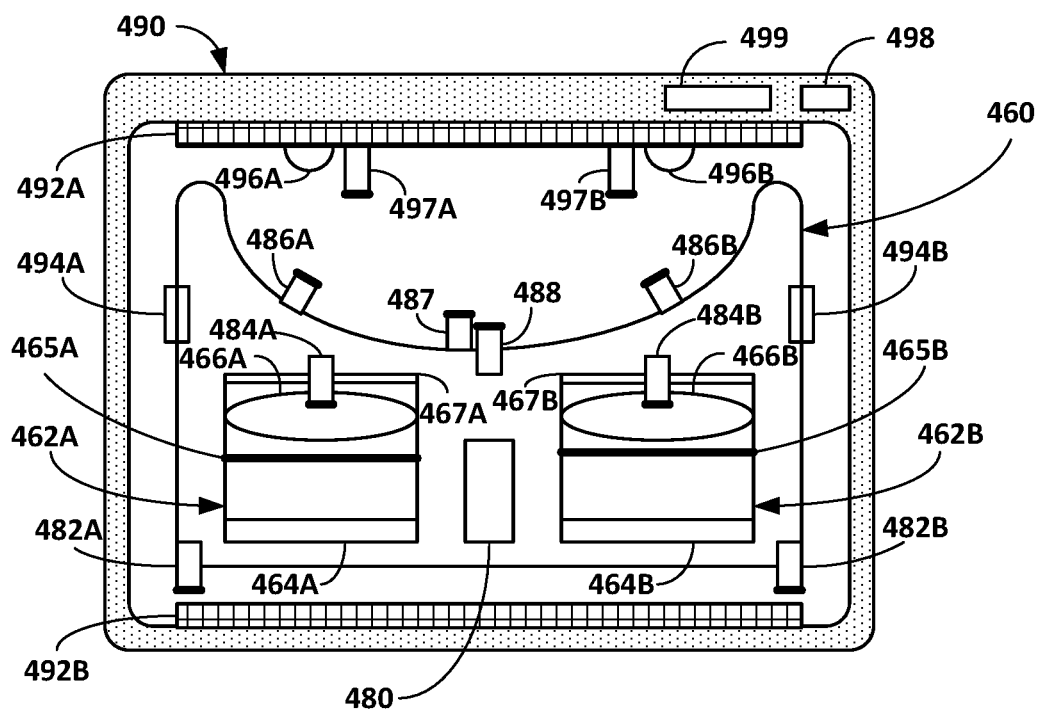
FIG. 6 is a conceptual diagram illustrating example components of an HMD that may be calibrated when the HMD is placed in a portable docking station.

FIG. 6 is a conceptual diagram illustrating example components of an HMD 460 that may be calibrated when the HMD is placed in a portable docking station 490. HMD 460 may operate substantially similar to any of HMDs 112A, 112B, and 212 from FIGS. 1A-1C and 2. HMD 460 is shown in FIG. 6 as having a headset form factor for ease of illustrating the internal components of HMD 460. In other examples, HMD 460 may comprise another form factor including an eyeglasses form factor. Portable docking station 490 may be substantially similar to any of portable docking stations 120A-120C and 220 from FIGS. 1A-1C and 2.

HMD 460 includes eyepieces 462A, 462B in which the right eyepiece 462A is configured to present images to the right eye of the user and the left eyepiece 462B is configured to present images to the left eye of the user. Herein, the term "eyepiece" means a three-dimensional geometrical area where images of acceptable quality may be presented to the user's eyes. In the example of FIG. 6, each of eyepieces 462A, 462B includes an electronic display 464A, 464B coupled to an imaging component 466A, 466B for conveying images generated by the electronic display 464A, 464B to eyepiece 462A, 462B where the user's eye is positioned when the user is wearing HMD 460. Each of imaging components 466A, 466B may be a lens, a mirror, or any other element having optical (i.e. focusing) power. Each of imaging components 466A, 466B may include a varifocal optical element having tunable or switchable optical power.

The calibration procedures described herein may include calibration of electronic displays 464A, 464B and/or imaging components 466A, 466B. In some examples, HMD 460 may include a single electronic display to provide images to both the user's eyes, sequentially or simultaneously. In other examples, HMD 460 may not include imaging components 466A, 466B, and may instead include pupil-replicating waveguides used to carry images in an angular domain generated by miniature projectors directly to the user's eyes. In these examples, the calibration procedures may include calibration of pupil-replicating waveguides, e.g. a color transfer function of the pupil-replicating waveguides.

The calibration procedures described herein may also include calibration of components within eyepieces 462A, 462B of HMD 460. Each of eyepieces 462A, 462B may include an eye-tracking system for tracking position and orientation of the user's eyes in real-time. The eye-tracking system may include an array of illuminators 467A, 467B for illuminating the user's eye, typically with invisible light such as infrared light, and a hot mirror 465A, 465B for reflecting the infrared light scattered by the user's eye and eye region of the user's face while transmitting visible light from the electronic display 464A, 464B. The eye-tracking system also includes an eye-tracking camera 484A, 484B for detecting an image of the user's eye with the pupil and reflections, so-called "glints," of illuminators 467A, 467B from the user's eye, for determining eye position and orientation. Herein, the term "eye region" denotes the area of the user's face including the eyes. The eye region includes the eye itself having a cornea, iris, and pupil. The eye-tracking system, namely eye-tracking cameras 484A, 484B and illuminators 467A, 467B may need to be calibrated to operate with an acceptable level of precision and fidelity of eye position and gaze angle determination within the area of eyepieces 462A, 462B.

The calibration procedures described herein further includes calibration of a variety of image capture devices included on HMD 460, in addition to eye-tracking cameras 484A, 484B within eyepieces 462A, 462B. HMD 460 includes inside-out cameras 482A, 482B for capturing image data representative of the physical environment surrounding the user. HMD 460 may further include a glabella camera 488 for capturing images of a glabella region of the user's face. The glabella camera 488 may be used to determine the distance between the middle of a rigid body of HMD 460 and the user's forehead or glabella for proper positioning and tuning of components within eyepieces 462A, 462B. HMD 460 may further include a mouth camera 487 to capture images of the user's mouth region, e.g. to facilitate speech recognition by HMD 460. Furthermore, HMD 460 may include lower temporal cameras 486A, 486B for capturing images of a side areas of the user's face to determine the distance between sides of the ridged body of HMD 460 and the side areas of the user's face. Some or all of the cameras of the HMD 460 may require periodic calibration.

According to the techniques described in this disclosure, cameras, display units, sensors, illuminators, and other components of HMD 460 may be calibrated when HMD 460 is placed in portable docking station 490. In the example of FIG. 6, portable docking station 490 includes calibration targets of checkerboard patterns 492A, 492B on the interior surfaces of portable docking station 490 and convex reflectors 496A, 496B positioned directly behind eyepieces 462A, 462B of HMD 460. Portable docking station 490 includes reference cameras 497A, 497B that are also positioned directly behind eyepieces 462A, 462B of HMD 460 to capture image data representative of a user's view of electronic displays 464A, 464B of HMD 460. Portable docking station 490 further includes fixtures 494A, 494B configured to receive and hold an HMD in a fixed position. Portable docking station 490 also includes a power supply 498 used to recharge an HMD when placed in portable docking station 490. Power supply 498 may comprise a battery or an electrical connector configured to plug to an electrical wall outlet or other external power supply.

In some examples, portable docking station 490 may further include a docking station control unit 499 that includes one or more printed-circuit boards having one or more processors, memory, and hardware to provide an operating environment for executing programmable operations to process and communicate data with external devices, such as HMD 460, a peripheral device associated with HMD 460, an external console, or a cloud-based computing system. For example, control unit 499 of portable docking station 490 may receive calibration data, e.g., the updated or adjusted parameters, of the components of HMD 460 and either store the calibration data locally in a memory card within docking station control unit 499 or upload the calibration data to a cloud-based computing system for storage or processing while HMD 460 is charging. In some examples, control unit 499 may handle at least some portion of the calibration processing for HMD 460. Control unit 499 of portable docking station 490 may receive the calibration data from HMD 460 via wireless transfer or a wired connection between HMD 460 and portable docking station 490. For example, fixtures 494A, 494B may provide a wired connection capable of carrying a charging current from power supply 498 to HMD 460 and/or transferring data between HMD 460 and control unit 499.

Docking station control unit 499 of portable docking station 490 may further operate as a content uploading and software update station for HMD 460 and any peripheral device associated with HMD 460. In this example, control unit 499 may handle processing of images and other content captured by the image capture devices and sensors of HMD 460, and transfer of the content and/or software between HMD 460 and a cloud-based computing system. As a further example, portable docking station 490 may include a docking station electronic display (not shown) for displaying charging status, calibration status, and/or software updates, and for reviewing the content captured by the image captured devices and sensors of HMD 460.

HMD 460 includes a control unit 480 coupled to the other components of HMD 460, including electronic displays 464A, 464B, imaging components 466A, 466B, illuminators 467A, 467B, eye-tracking cameras 484A, 484B, and inside-out cameras 482A, 482B. Control unit 480 may operate substantially similar to internal control unit 110 of HMDs 112A-112B from FIGS. 1A-1C and internal control unit 210 of HMD 212 from FIG. 2. Moreover, in accordance with techniques of this disclosure, control unit 480 includes a calibration engine that may operate substantially similar to calibration engine 324 of HMD 112 from FIG. 3. For example, during operation of HMD 460, control unit 480 generates images to be displayed by the electronic displays 464A, 464B, energizes the illuminators 467A, 467B, obtains images of the eye regions from the corresponding eye-tracking cameras 484A, 484B, and determines user's gaze direction and convergence angle of the user's eyes from the eye pupils positions and glints positions in the obtained images. Once the convergence angle has been determined, control unit 480 may adjust the focal lengths of imaging components 466A, 466B to lessen the vergence-accommodation conflict, that is, a discrepancy between the eye vergence angle and the eye focusing distance.

The calibration or re-calibration procedures described herein may be activated when HMD 460 is placed in portable docking station 490, e.g., to recharge the battery of HMD 460 and/or securely store HDM 460 when not in use. Control unit 480 of HMD 460 may run various calibration routines during or immediately after HMD 460 is charged so as to not create an additional maintenance step for the user of HMD 460. For example, to calibrate an image capture device of HMD 460, e.g., one of inside-out cameras 482A, 482B or one of eye-tracking cameras 484A, 484B, control unit 480 may take an image of a calibration target using the camera, and derive a camera model by comparing the obtained image with the target. Control unit 480 may also determine a calibration drift by comparing the image to a reference image stored in memory. To determine intrinsic parameters of the camera, control unit 480 may use checkerboard patterns 492A, 492B as the calibration targets. To determine extrinsic parameters of eye-tracking cameras 484A, 448B and/or to calibrate illuminators 467A, 467B, control unit 480 may use convex reflectors 496A, 496B as the calibration targets.

To calibrate electronic displays 464A, 464B, control unit 480 may make use of reference cameras 497A, 497B positioned within portable docking station 490 such that they appear within the corresponding eyepieces 462A, 462B of HMD 460 when HMD 460 is placed in portable docking station 490. Reference cameras 497A, 497B may have field of view, spatial resolution, and brightness and color sensitivity similar to those of a human eye. Reference cameras 497A, 497B are configured to capture images produced by electronic displays 464A, 464B. For purposes of calibration, the images produced by electronic displays 464A, 464B may be of a calibration target, such as checkboard patterns 492A, 492B. In some examples, control unit 480 may calibrate different components of HMD 460 in parallel, i.e. concurrently, to save time.

Checkerboard patterns 492A, 492B may be used as calibration targets for calibrating components of HMD 460 including eye-tracking cameras 484A, 484B, glabella camera 488, mouth camera 487, lower temporal cameras 486A, 486B, inside-out cameras 482A, 482B, and electronic displays 464A, 464B. Convex reflectors 496A, 496B may be used as calibration targets for calibrating components of HMD 460 included eyepieces 462A, 462B such as eye-tracking cameras 484A, 484B and illuminators 487A, 487B. The eye-tracking system operates by energizing illuminators 487A, 487B and detecting reflections or glints of illuminators 487A, 487B in an image of a human eye obtained by eye-tracking cameras 484A, 484B. For the calibration process described herein, convex reflectors 486A, 496B are used in place of a human eye such that the glints of illuminators 467A, 467B are detected on the convex surfaces of convex reflectors 496A, 496B. For ease of calibration, the radius of curvature of a convex reflector may be selected to be close to a typical radius of curvature of human eye's cornea. Since the position of the convex reflectors 496A, 496B within portable docking station 490 is known, the components of the eye-tracking system may be calibrated to yield the correct position. Furthermore, brightness of the glints may be compared to pre-defined brightness values to determine if the light emitted by illuminators 467A, 467B remains within eye-safe limits.

In order to perform calibration using checkerboard patterns 492A, 492B, control unit 480 configures one of the cameras, e.g. eye-tracking camera 484A, to capture images of one of checkerboard patterns 492A, 492B, e.g., checkerboard pattern 492A. Eye-tracking camera 484A captures images of checkerboard pattern 492A in infrared light emitted by illuminator 467A and reflected from the hot mirror 465A through the corresponding imaging component 466A. As one example, the entire imaging path of eyepiece 462A may have optical aberrations resulting in corner distortion of the captured images. Since the geometry of checkerboard pattern 492A is known, control unit 480 may correct for the corner distortion.

Control unit 480 may compare the captured images to a pinhole camera image of a reference checkerboard pattern and displacements (i.e., errors) for each white and black feature of checkerboard pattern 492A in the captured images relative to the corresponding white and black feature of the pinhole camera image of the reference checkerboard pattern may be determined. Control unit 480 may then build a camera model based on the determined positions of the white and black features in the captured images. The camera model may also be based on a pinhole camera model with tabulated reprojection errors. Once the camera model is determined, control unit 480 may correct the distortion. This correction allows control unit 480 to capture undistorted images using eye-tracking camera 484A, which enables better glint location determination and, consequently, better eye-tracking. Other cameras on HMD 460 may be calibrated in a similar manner using checkerboard patterns 492A, 492B.

In order to perform calibration using convex reflectors 496A, 496B, control unit 480 configures one of the cameras, e.g. eye-tracking camera 484A, to capture images of illuminator glints reflected by one of convex reflectors 496A, 496B, e.g., convex reflector 496A. To capture the images, illuminator 467A is energized to produce illuminating light, and then eye-tracking camera 484A captures an image of convex reflector 496A that includes calibration illuminator glints or reflections of the array of LEDs included in illuminator 467A from convex reflector 496A. Control unit 480 then determines the positions of the calibration illuminator glints in the captured images. As one example, the captured images of convex reflector 496A may include calibration illuminator glints at positions that are offset relative to predetermined reference positions. The reference positions of the illuminator glints may be determined during a previous in-field calibration or during a factory calibration.

Control unit 480 may correct the determined positions using a camera model of eye-tracking camera 484A built during a previously performed camera calibration. Based on the camera model, control unit 480 may determine offsets of the corrected positions of the calibration illuminator glints relative to the reference positions. The determined offsets may indicate a drift of the eye-tracking system elements extrinsic to eye-tracking camera 484A, such as illuminator 467A and electronic display 464A. Once the drift of the eye-tracking system is quantified in this manner, control unit 480 may correct the drift.

In some examples, control unit 480 may also measure brightness of the calibration illuminator glints in the captured images. Control unit 480 may compare the measured brightness in the captured images to predetermined brightness values stored in memory or brightness values of the reference illuminator glints. If the measured brightness of the calibration illuminator glints in the captured images is higher than a threshold, e.g., the predetermined brightness values or the brightness values of the reference illuminator glints, control unit 480 may reduce the optical power levels of light emitted by illuminator 467A to stay within eye-safe limits. In additional examples, portable docking station 490 may include a beam profiler, e.g., one or more of references cameras 497A, 497B or another dedicated camera (not shown in FIG. 6), to determine whether a shape and/or intensity of illuminators 467A, 467B has changed during operation. In one example, portable docking station 490 may further include an optical power meter used to measure the intensity of illuminators 467A, 467B based on images captured by the beam profiler.

Figure 7:
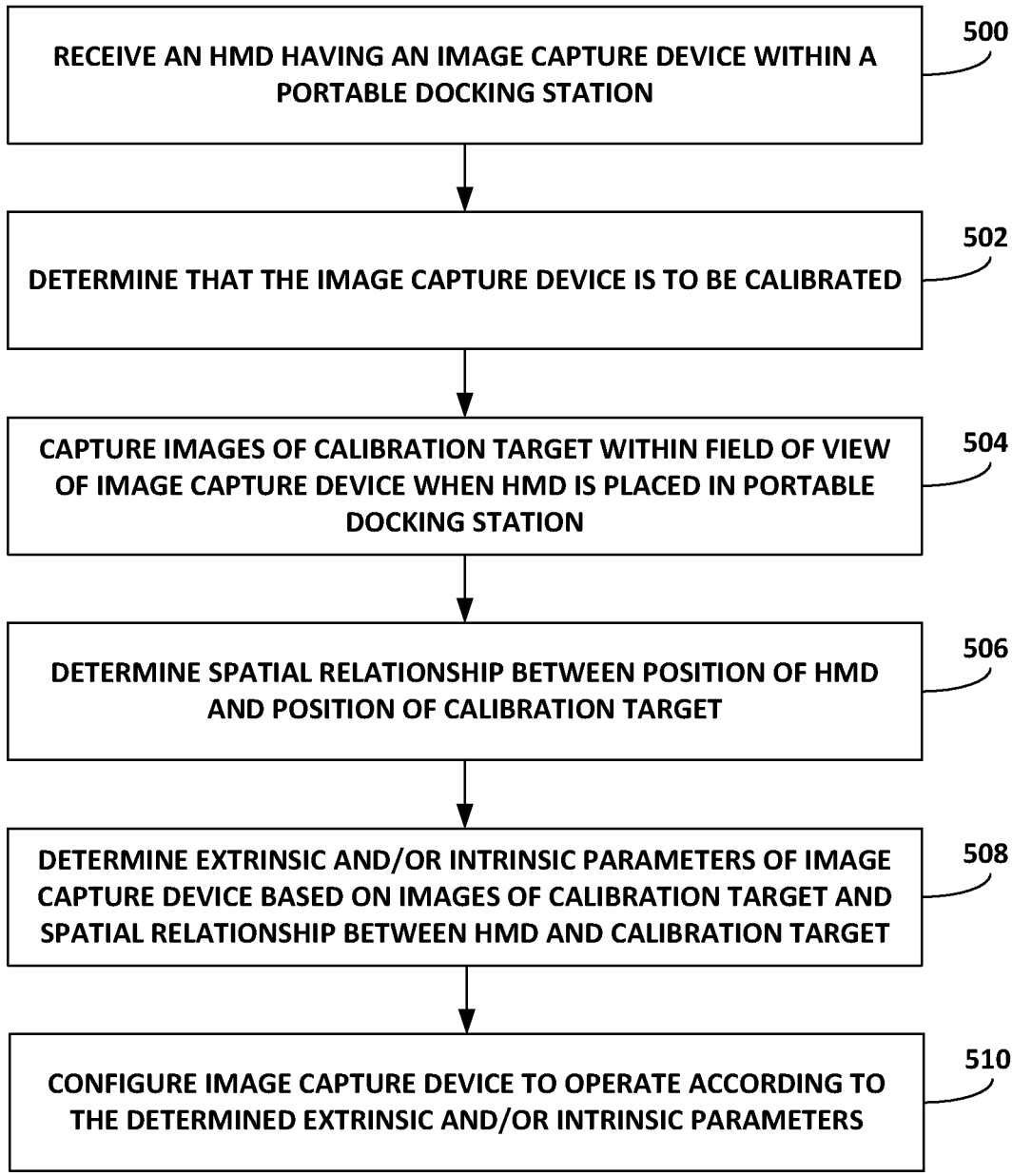
FIG. 7 is a flowchart illustrating an example operation of calibrating components of an HMD when placed in a portable docking station, in accordance with the techniques of the disclosure.

FIG. 7 is a flow chart illustrating an example operation of calibrating components of an HMD when placed in a portable docking station, in accordance with the techniques of the disclosure. The example operation is described with respect to HMD 112A and portable docking station 120A from FIG. 1A. In other examples, the example operation may be performed with respect to any of HMDs 112A-112B or 212 and any of portable docking stations 120A-120D and 220 from FIGS. 1A-1C, 2, and 4.

Portable docking station 120A receives HMD 112A having at least one image capture device, e.g., inside-out cameras 108 and eye-tracking cameras 114 (500). Portable docking station 120A includes a calibration target 122A, 122B that is within a field of view of the image capture device of HMD 112A when HMD 112A is placed in portable docking station 120A.

A calibration engine, executed on HMD 112A or a peripheral device associated with HMD 112A, determines that the at least one image capture device of HMD 112A is to be calibrated (502). In one example, the calibration engine may determine that the image capture device of HMD 112A is to be calibrated upon determining that HMD 112A has been received by portable docking station 120A based on a proximity sensor or a magnetic sensor included in HMD 112A and/or portable docking station 120A. In another example, the calibration engine may determine that the image capture device of HMD 112A is to be calibrated upon determining that a rechargeable battery of HMD 112A is fully charged while HMD 112A is within portable docking station 120A.

Upon determining that the at least one image capture device of HMD 112A is to be calibrated, the calibration engine configures the at least one image capture device of HMD 112A to capture one or more images of calibration target 122A, 122B that are within a field of view of the at least one image capture device when HMD 112A is placed in portable docking station 120A (504). The calibration engine may, in some examples, determine a spatial relationship between a position of HMD 112A and a position of calibration target 122A, 122B within portable docking station 120A (506). In the example of FIG. 1A, portable docking station 120A includes fixtures 124 and nose rest 126 that receive and hold HMD 112A in a fixed position within portable docking station 120A such that the spatial relationship is a known spatial relationship between the fixed position of HMD 112A and the position of calibration target 122A, 122B included in portable docking station 120A. In another example, as described above with respect to FIG. 1C, the HMD may not be held in a fixed position within the portable docking station. In this example, the calibration engine may determine the spatial relationship between a position of the HMD and a position of the calibration target within the portable docking station based on one or more fiducial marks adjacent to or embedded within the at least one calibration target.

The calibration engine then analyzes the one or more images of calibration target 122A, 122B captured by the image capture device of HMD 112A, and calibrates the at least one image capture device of HMD 112A by determining intrinsic parameters and/or extrinsic parameters of the image capture device based on the captured one or more images and the spatial relationship between HMD 112A and calibration target 122A, 122B (508). The calibration engine may be configured to update or adjust the parameters to correct for changes from initial calibration settings of the image capture device of HMD 112A. The calibration engine then configures the at least one image capture device of HMD 112A to operate according to the determined intrinsic and/or extrinsic parameters (510). Example extrinsic parameters adjusted by the calibration engine may include the rotation and translation used to transform from the 3D real-world coordinates to the 3D camera coordinates. Example intrinsic parameters adjusted by the calibration engine may include the focal length, the principal point, and the skew coefficient used to transform the 3D camera coordinates into the 2D image coordinates. In some examples, the parameters adjusted by the calibration engine may further include lens distortion parameters.

As one example, the calibration engine may calibrate eye-tracking camera 114A of HMD 112A by determining intrinsic parameters of eye-tracking camera 114A, for example, based on images of the checkerboard pattern of calibration target 122A captured by eye-tracking camera 114A, and configuring eye-tracking camera 114A to operate according to the determined intrinsic parameters. Continuing the example, the calibration engine may also calibrate eye-tracking camera 114A by determining extrinsic parameters of eye-tracking camera 114A based on images of reflected light captured by eye-tracking camera 114A, where the light is emitted by illuminator 116A of HMD 112A and reflected by a convex reflector included in portable docking station 112A, and further configuring eye-tracking camera 114A to operate according to the determined extrinsic parameters. In other examples, the calibration engine may calibrate at least one of inside-out cameras 108 of HMD 112A in a similar manner. The calibration engine may be further configured to calibrate at least one of display 103, illuminators 116, or sensors 106 of HMD 112A with respect to the at least one image capture device of HMD 112A.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), metal programmable gate arrays (MPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A system comprising:
   a head mounted display (HMD) comprising at least one image capture device;
   a portable docking station configured to receive the HMD, the portable docking station including at least one calibration target that is within a field of view of the at least one image capture device when the HMD is placed in the portable docking station; and
   a processor executing a calibration engine configured to calibrate the at least one image capture device of the HMD based on one or more images of the at least one calibration target captured by the at least one image capture device when the HMD is placed in the portable docking station.

2. The system of claim 1, wherein the HMD further comprises one or more of a display, at least one illuminator, or at least one sensor, and wherein the calibration engine is further configured to calibrate at least one of the display, the at least one illuminator, or the at least one sensor with respect to the at least one image capture device.

3. The system of claim 1, wherein to calibrate the at least one image capture device, the calibration engine is configured to:
   determine one or more of intrinsic parameters or extrinsic parameters of the at least one image capture device based on the one or more images of the at least one calibration target captured by the at least one image capture device when the HMD is placed in the portable docking station; and
   configure the at least one image capture device of the HMD to operate according to the one or more of the intrinsic parameters or the extrinsic parameters.

4. The system of claim 1,
   wherein the HMD further comprises at least one illuminator;
   wherein the at least one image capture device comprises an eye-tracking camera;
   wherein the at least one calibration target included in the portable docking station comprises a convex reflector for reflecting light emitted by the at least one illuminator towards the eye-tracking camera; and wherein the calibration engine is configured to determine extrinsic parameters of the eye-tracking camera based on one or more images of the reflected light captured by the eye-tracking camera.

5. The system of claim 1,
wherein the at least one image capture device comprises an eye-tracking camera;
wherein the at least one calibration target included in the portable docking station comprises a checkerboard pattern within the field of view of the eye-tracking camera; and
wherein the calibration engine is configured to determine intrinsic parameters of the eye-tracking camera based on one or more images of the checkerboard pattern captured by the eye-tracking camera.

6. The system of claim 1,
wherein the at least one calibration target included in the portable docking station includes one or more fiducial marks either adjacent to the at least one calibration target or embedded within the at least one calibration target; and
wherein the calibration engine is configured to:
determine a spatial relationship between a position of the HMD when the HMD is placed in the portable docking station and a position of the at least one calibration target within the portable docking station based on the one or more fiducial marks, and
calibrate the at least one image capture device further based on the determined spatial relationship between the position of the HMD and the position of the at least one calibration target.

7. The system of claim 1,
wherein the portable docking station includes one or more fixtures configured to receive and hold the HMD in a fixed position when the HMD is placed in the portable docking station; and
wherein the calibration engine is configured to calibrate the at least one image capture device further based on a known spatial relationship between the fixed position of the HMD and a position of the at least one calibration target within the portable docking station.

8. The system of claim 1, wherein the calibration engine is configured to calibrate the at least one image capture device in response to at least one of determining that the HMD has been received within the portable docking station or determining that a rechargeable battery of the HMD is charged to at least a threshold charge level while the HMD is within the portable docking station.

9. The system of claim 1, further comprising a charging circuit configured to charge a rechargeable battery of the HMD when the HMD is placed in the portable docking station.

10. The system of claim 1,
wherein the at least one image capture device of the HMD comprises at least one first image capture device, the system further comprising a peripheral device comprising at least one second image capture device; and
wherein the portable docking station is further configured to receive the peripheral device adjacent to the HMD and position the peripheral device such that a display of the HMD is within a field of view of the at least one second image capture device of the peripheral device when the HMD is placed in the portable docking station.

11. The system of claim 10, wherein the calibration engine is further configured to calibrate the display of the HMD and the at least one second image capture device of the peripheral device based on one or more images produced on the display of the HMD that are captured by the at least one second image capture device of the peripheral device when both the HMD and the peripheral device are placed in the portable docking station.

12. The system of claim 11,
wherein the HMD includes one or more fiducial marks that are within the field of view of the at least one second image capture device of the peripheral device when both the HMD and the peripheral device are placed in the portable docking station; and
wherein the calibration engine is configured to:
determine a spatial relationship between a position of the HMD and a position of the peripheral device when both the HMD and the peripheral device are placed in the portable docking station based on the one or more fiducial marks, and
calibrate the display of the HMD and the at least one second image capture device of the peripheral device further based on the determined spatial relationship between the position of the HMD and the position of the peripheral device.

13. The system of claim 10, wherein the processor is integrated within one of the HMD or the peripheral device.

14. The system of claim 1, wherein the portable docking station comprises one of a carrying case or a cover for the HMD.

15. The system of claim 1, wherein the HMD comprises artificial reality glasses, and wherein the at least one calibration target is positioned at a location along an arm of the artificial reality glasses so that the at least one calibration target is within the field of view of the at least one image capture device when the arm of the artificial reality glasses is folded for placement of the artificial reality glasses in the portable docking station.

16. The system of claim 1, wherein the processor is integrated within the HMD.

17. A method comprising:
receiving, by a portable docking station, a head mounted display (HMD) comprising at least one image capture device, wherein the portable docking station includes at least one calibration target that is within a field of view of the at least one image capture device when the HMD is placed in the portable docking station;
determining that the at least one image capture device of the HMD is to be calibrated; and
calibrating the at least one image capture device of the HMD based on one or more images of the at least one calibration target captured by the at least one image capture device when the HMD is placed in the portable docking station.

18. The method of claim 17, wherein determining that the at least one image capture device of the HDM is to be calibrated comprises determining that the HMD has been received by the portable docking station based on one of a proximity sensor or a magnetic sensor.

19. The method of claim 17, wherein determining that the at least one image capture device of the HDM is to be calibrated comprises determining that a rechargeable battery of the HMD is charged to at least a threshold charge level while the HMD is within the portable docking station.

20. A non-transitory computer-readable medium comprising instruction that, when executed, cause on or more processors to:
determine that a head mounted display (HMD) has been received by a portable docking station, wherein the portable docking station includes at least one calibration target that is within a field of view of at least one image capture device of the HMD when the HMD is placed in the portable docking station;
determine that the at least one image capture device of the HMD is to be calibrated; and
calibrate the at least one image capture device of the HMD based on one or more images of the at least one calibration target captured by the at least one image capture device when the HMD is placed in the portable docking station.

* * * * *